US011398661B1

(12) United States Patent
Kaye

(10) Patent No.: US 11,398,661 B1
(45) Date of Patent: Jul. 26, 2022

(54) POLYPROPYLENE CARBONATE AND CATALYSTS

(71) Applicant: Apple Inc., Cupertino, CA (US)

(72) Inventor: Steven Kaye, Oakland, CA (US)

(73) Assignee: Apple Inc., Cupertino, CA (US)

( * ) Notice: Subject to any disclaimer, the term of this patent is extended or adjusted under 35 U.S.C. 154(b) by 2 days.

(21) Appl. No.: 17/027,005

(22) Filed: Sep. 21, 2020

Related U.S. Application Data

(63) Continuation of application No. 15/998,446, filed on Aug. 15, 2018, now Pat. No. 10,818,903.

(60) Provisional application No. 62/545,881, filed on Aug. 15, 2017.

(51) Int. Cl.
*H01M 50/449* (2021.01)
*C09D 169/00* (2006.01)
*H01M 50/20* (2021.01)
*H01M 50/44* (2021.01)
*H01M 50/431* (2021.01)
*H01M 50/446* (2021.01)

(52) U.S. Cl.
CPC ........ *H01M 50/449* (2021.01); *C09D 169/00* (2013.01); *H01M 50/20* (2021.01); *H01M 50/431* (2021.01); *H01M 50/44* (2021.01); *H01M 50/446* (2021.01)

(58) Field of Classification Search
CPC .. H01M 50/449; H01M 50/44; H01M 50/446; H01M 50/20; H01M 50/431
See application file for complete search history.

(56) References Cited

U.S. PATENT DOCUMENTS

| 5,120,576 | A  | 6/1992  | Goldsmith et al. |
| 6,740,416 | B1 | 5/2004  | Yokogawa et al. |
| 7,230,404 | B2 | 6/2007  | Kimoto et al. |
| 7,736,799 | B1 | 6/2010  | Hermann et al. |
| 7,749,647 | B1 | 7/2010  | Hermann et al. |
| 7,749,650 | B1 | 7/2010  | Hermann et al. |
| 7,781,097 | B2 | 8/2010  | Mehta et al. |
| 7,820,319 | B2 | 10/2010 | Mehta et al. |
| 8,277,965 | B2 | 10/2012 | Hermann et al. |
| 8,367,233 | B2 | 2/2013  | Hermann et al. |
| 8,541,126 | B2 | 9/2013  | Hermann et al. |
| 8,592,067 | B2 | 11/2013 | Yokoyama et al. |
| 8,592,076 | B2 | 11/2013 | Sugita et al. |

(Continued)

FOREIGN PATENT DOCUMENTS

| CN | 104838195 A | 8/2015 |
| EP | 1153739 | 11/2001 |

(Continued)

OTHER PUBLICATIONS

Li et al., "Study on the influence of metal residue on thermal degradation of poly(cyclohexene carbonate)," *J. Polym. Res.*, 2011, 18:1177-1183.

(Continued)

*Primary Examiner* — Jane J Rhee
(74) *Attorney, Agent, or Firm* — BakerHostetler

(57) ABSTRACT

The disclosure is directed to an apparatus comprising a substrate and a composition disposed on the substrate. The catalyst comprises a polypropylene carbonate (PPC) and a catalyst selected from the group consisting of an acid with a pKa less than or equal to 1 in water, a phase transfer catalyst, and a metal salt. The substrate and composition can be used in insulators between batteries, for example in a battery pack.

15 Claims, 19 Drawing Sheets

(56) References Cited

U.S. PATENT DOCUMENTS

| | | |
|---|---|---|
| 8,875,828 B2 | 11/2014 | Rawlinson et al. |
| 8,968,949 B2 | 3/2015 | Hermann et al. |
| 9,093,726 B2 | 7/2015 | Prilutsky et al. |
| 10,608,224 B2 | 3/2020 | Kaye et al. |
| 2003/0082379 A1 | 5/2003 | Hrubesh et al. |
| 2003/0099844 A1 | 5/2003 | Hanahata et al. |
| 2005/0192366 A1 | 9/2005 | Ou et al. |
| 2006/0068278 A1 | 3/2006 | Bloom et al. |
| 2006/0164795 A1 | 7/2006 | Jones et al. |
| 2006/0261304 A1 | 11/2006 | Muthukumaran et al. |
| 2009/0082479 A1 | 3/2009 | Cho |
| 2010/0136404 A1 | 6/2010 | Hermann et al. |
| 2011/0003209 A1 | 1/2011 | Katayama et al. |
| 2011/0159340 A1 | 6/2011 | Hu et al. |
| 2012/0244393 A1 | 9/2012 | Stanek et al. |
| 2012/0326071 A1 | 12/2012 | Pasquero et al. |
| 2013/0091682 A1 | 4/2013 | Zhang et al. |
| 2014/0193685 A1 | 7/2014 | Lim |
| 2014/0224465 A1 | 8/2014 | Andrasi et al. |
| 2014/0287641 A1 | 9/2014 | Steiner |
| 2016/0003404 A1 | 1/2016 | Shibata et al. |
| 2019/0140237 A1 | 5/2019 | Kaye et al. |
| 2019/0148363 A1 | 5/2019 | Kaye et al. |

FOREIGN PATENT DOCUMENTS

| | | |
|---|---|---|
| JP | H11-351493 | 12/1999 |
| JP | 2005-036975 A | 2/2005 |
| JP | 3674585 B2 | 7/2005 |
| JP | 2011-23355 | 2/2011 |
| JP | 2013-512175 | 4/2013 |
| JP | 2013-518961 A | 5/2013 |
| JP | 2013-534958 A | 9/2013 |
| KR | 2010-0036104 A | 4/2010 |
| KR | 10-0998474 B1 | 12/2010 |
| WO | WO 2004/064082 | 7/2004 |
| WO | WO 2010/143408 A1 | 12/2010 |
| WO | WO 2011/121901 A1 | 10/2011 |
| WO | WO 2012/000184 | 1/2012 |
| WO | WO 2012/065288 | 5/2012 |
| WO | WO 2014/087834 | 6/2014 |
| WO | WO 2014/132652 | 9/2014 |

OTHER PUBLICATIONS

Phillips et al., "Thermal decomposition of poly(propylene carbonate): End-capping, additives, and solvent effects," *Polymer Degradation and Stability*, 2016, vol. 125, pp. 129-139.

Spencer et al., "Stabilization of the Thermal Decomposition of Poly(Propylene Carbonate) Through Copper Ion Incorporation and Use in Self-Patterning," *Journal of Electronic Materials*, 2011, vol. 40, No. 6, pp. 1350-1363.

Spencer et al.,"Decomposition of poly(propylene carbonate) with UV sensitive iodonium salts," *Polymer Degradation and Stability*, 2011, vol. 96, pp. 686-702.

US 11,398,661 B1

POLYPROPYLENE CARBONATE AND CATALYSTS

PRIORITY

This application is a continuation of U.S. patent application Ser. No. 15/998,446, entitled "POLYPROPYLENE CARBONATE AND CATALYSTS," filed on Aug. 15, 2018, which claims the benefit under 35 U.S.C. § 119(e) of U.S. Provisional Patent Application Ser. No. 62/545,881, entitled "POLYPROPYLENE CARBONATE AND CATALYSTS," filed on Aug. 15, 2017, each of which is incorporated herein by reference in its entirety.

BACKGROUND

Polypropylene carbonate (PPC) is a co-polymer of propylene oxide and $CO_2$. PPC is used on its own as a thermoplastic material, and as a component of other materials such as commercial resins.

PPC has an initial decomposition temperature ($T_{dec}$) of approximately 220° C.-240° C. Numerous efforts have focused on increasing the PPC $T_{dec}$. For example, the PPC $T_{dec}$ can be increased by capping the chain ends of PPC. As demonstrated by Kohl et al., capping PPC with vinyl chloroform, benzoyl chloride, and 4-nitrophenyl chloroformate results in increased $T_{dec}$. Likewise, citric acid increases $T_{dec}$ of PPC. (Kohl et al., *Polym. Degrad. Stab.*, 2016, 125). Though acids and transition metal ions such as $Zn^{2+}$ have been observed to decrease $T_{dec}$ of PPC, such effects have been deemed undesirable. See Kohl et al, *Polym. Degrad. Stab.*, 2011, 96, 686; Kohl et al, *J. Elec. Mater.* 2011, 40, 1350; and Wang et al., *J. Polym. Res.*, 2011, 18, 1177.

SUMMARY

In one aspect, the disclosure is directed to an apparatus comprising a substrate and a composition disposed on the substrate. The catalyst comprises a polypropylene carbonate (PPC) and a catalyst selected from the group consisting of an acid with a pKa less than or equal to 1 in water, a phase transfer catalyst, and a metal salt.

The PPC can have any average molecular weight known in the art. In some variations, the PPC can have an average molecular weight within a particular range. In some variation, the PPC has an average molecular weight of at least 100 kDa and less than or equal to 400 kDa.

In some variations, the catalyst is an acid with a pKa of less than 1 in water. In some variations, the pKa of the acid can be less than 0 in water. In some variations, the pKa of the acid can be less than −2 in water. In some variations, the pKa of the acid can be less than −5 in water. In some variations, the pKa of the acid can be less than −10 in water. In further variations, the acid can be selected from the group consisting of p-tol-$SO_3H$ (p-tolulenesulfonic acid), $CF_3(CF_2)_3CO_2H$ (perfluoropentanoic acid), $CF_3(CF_2)_6CO_2H$ (perfluorooctanoic acid), sulfuric acid, perchloric acid, or triflic acid (trifluoromethanesulfonic acid).

In some variations, the catalyst is a phase transfer catalyst selected from the group consisting of a quaternary ammonium salt or a quaternary phosphonium-derivative salt. The quaternary ammonium salt can be selected from the group consisting of 1-butyl-1-methylpyrrolidine, $NBu_4$-acetate, $NBu_4$-$BBu_4$, $NEt_4$-acetate, $NEt_4$-F, $NEt_4$-$HCO_3$, $NEt_4$-$NO_3$, $NMe_4$-acetate, $NEt_4$-Cl, $NBu_4$-$BPh_4$, and $NEt_4$-$CF_3SO_3$.

In some variations, the catalyst is a metal salt. In some variations, the metal salt is a salt of a metal selected from the group consisting of Al, Fe, Co, Mn, Cu, Ni, Zn, Pd, Mg, and Na. In further variations, the metal salt is selected from the group consisting of Al(AcAc)$_3$, Mn(AcAc)$_3$, Fe(AcAc)$_3$, Co(AcAc)$_2$, Co(AcAc)$_3$, Ni(AcAc)$_2$, Cu(AcAc)$_2$, Zn(AcAc)$_2$, $_2$Mg(OAc)$_2$, and Na(OAc). The metal salt can be selected from the group consisting of Fe(AcAc)$_3$, Al(AcAc)$_3$, and Zn(AcAc)$_2$.

The catalyst can be in an amount relative to the PPC. In some variations, the catalyst is from 500-50000 ppm relative to the PPC. Other variations are possible.

In still further variations, the substrate can be selected from the group consisting of silica, $Al_2O_3$, $ZrO_2$, and MgO. For example, the silica substrate can be fumed silica.

The apparatus can also include a fibrous material such as glass fibers, ceramic fibers, and silica fibers.

The apparatus can also include an opacifier having a mean extinction coefficient greater than $1 \times 10^4$ $m^{-1}$ at temperatures greater than 250° C. The opacifier can be a material selected from the group consisting of silicon carbide, titania, and a carbonaceous material. In instances where the opacifier is a carbonaceous material (e.g., graphite, carbon black, carbon nanotubes, and graphene), and the carbonaceous material can be coated with a refractory material that inhibits oxidation at a carbon oxidation temperature. Examples of such refractory materials include alumina, titania, nickel, boron nitride, zirconia, and $AlF_3$. In some variations, the oxidation temperature of the opacifier coated with the refractory material is greater than 800° C.

In another aspect, the disclosure is directed to an apparatus. The apparatus can include a first component or a second component. The apparatus including the substrate and composition is disposed between the first component and second component.

In additional aspects, the disclosure is directed to an apparatus that includes first and second battery cells. The battery cells can include the apparatus as a shutdown insulator comprising a substrate and PPC-catalyst composition. The PPC-catalyst composition can be any composition described herein.

BRIEF DESCRIPTION OF THE DRAWINGS

The disclosure will be readily understood by the following detailed description in conjunction with the accompanying drawings, wherein like reference numerals designate like structural elements, and in which:

FIG. 2B and FIG. 2B-1 depict the PPC $T_{dec}$ when combined with 40,000 ppm certain acid, phase transfer (ammonium and phosphonium), and metal salt additives 85%, 50%, and 5% of PPC when the composition is heated at a 10° C. per minute ramp rate, according to some illustrative embodiments;

DETAILED DESCRIPTION

Description of various embodiments will now be made with reference to the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Compositions

In various aspects, the disclosure is directed to compositions that include a PPC and a catalyst. The catalyst catalyzes PPC decomposition at a lower $T_{dec}$ than in the absence of a catalyst. Upon PPC decomposition, the decomposition product has very little residue. When combined with an insulating substrate, the resulting decomposed product is thermally insulating. Specifically, when combined with an insulator, the decomposed material can act as a shutdown insulator with thermal properties that reduce heat propagation through the insulating material. Alternatively, the composition can be used as sacrificial binders to bind low melting point substrates, such as plastics used in electronic applications and the like.

Polypropylene Carbonate

PPCs decompose at a particular decomposition temperature. The initial decomposition temperature ($T_{dec}$) of PPC is approximately 220° C.-240° C. when measured at a ramp rate 10° C./min in dry air. PPC is fully decomposed at approximately 300° C. when measured at a ramp rate 10° C./min in dry air. Further, PPC produces very little residue after combustion (less than 4 ppm for pure PPC).

Figure 1A:
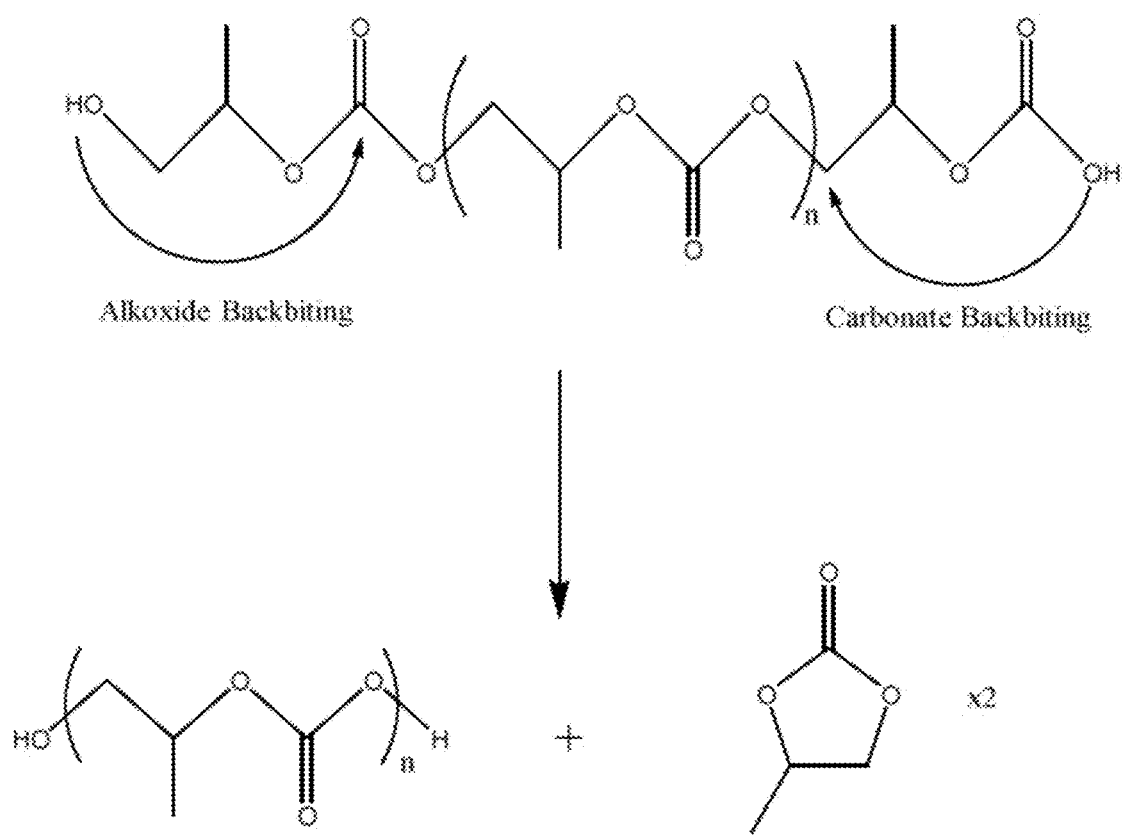
FIG. 1A depicts a chain unzipping decomposition mechanism of PPC, according to some illustrative embodiments.
Figure 1B:
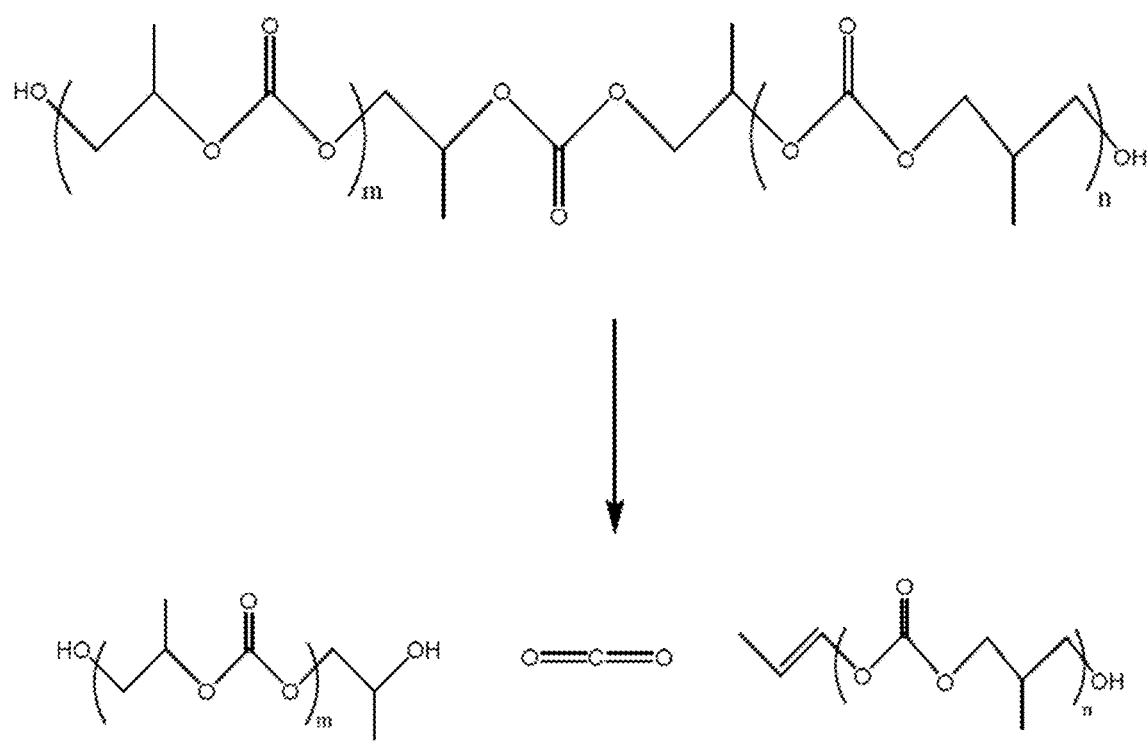
FIG. 1B depicts a chain scissoring decomposition mechanism of PPC, according to some illustrative embodiments.

PPC decomposition temperatures can be reduced when PPC is combined with a decomposition catalyst. Without wishing to be limited to a particular mechanism or mode of action, PPC can be decomposed by one or more mechanisms that can include chain unzipping and chain scissoring. These mechanisms are depicted in FIGS. 1A and 1B, respectively, and have been described, for example, in Kohl et al., *Polym. Degrad. Stab.*, 2016, 125, which is incorporated herein by reference in its entirety.

As depicted in FIG. 1A, the chain unzipping mechanism cleaves propylene substituents from the polymer chain terminus, resulting in the formation of a polypropylene carbonate and a shorter polymer. The chain unzipping mechanism is the primary PPC decomposition mechanism at lower temperatures. As depicted in FIG. 1B, the chain scissoring mechanism results cleaves in the interior of the PPC chain, resulting in two shorter PPC chains and $CO_2$. The chain scissoring mechanism is the primary PPC decomposition mechanism at higher temperatures.

As described herein, any molecular weight PPC can be used. In some variations, the average molecular weight of PPC ranges from a mean molecular weight of 10 kDa to 400 kDa. In some variations, the PPC has a mean molecular weight of less than or equal to 400 kDa. In some variations, the PPC has a mean molecular weight of less than or equal to 360 kDa. In some variations, the PPC has a mean molecular weight of less than or equal to 320 kDa. In some variations, the PPC has a mean molecular weight of less than or equal to 280 kDa. In some variations, the PPC has a mean molecular weight of less than or equal to 240 kDa. In some variations, the PPC has a mean molecular weight of less than or equal to 200 kDa. In some variations, the PPC has a mean molecular weight of less than or equal to 160 kDa. In some variations, the PPC has a mean molecular weight of less than or equal to 120 kDa. In some variations, the PPC has a mean molecular weight of less than or equal to 80 kDa. In some variations, the PPC has a mean molecular weight of less than or equal to 40 kDa.

In some variations, the PPC has a mean molecular weight of at least 10 kDa. In some variations, the PPC has a mean molecular weight of at least 40 kDa. In some variations, the PPC can have a mean molecular weight of at least 80 kDa. In some variations, the PPC can have a mean molecular weight of at least 120 kDa. In some variations, the PPC can have a mean molecular weight of at least 160 kDa. In some variations, the PPC can have a mean molecular weight of at least 200 kDa. In some variations, the PPC can have a mean molecular weight of at least 240 kDa. In some variations, the PPC can have a mean molecular weight of at least 280 kDa. In some variations, the PPC can have a mean molecular weight of at least 320 kDa. In some variations, the PPC can have a mean molecular weight of at least 360 kDa.

Catalysts

As described herein, the compositions described herein include one or more catalysts that catalyze PPC decomposition. By catalyzing PPC decomposition, the catalyst lowers the PPC $T_{dec}$.

In some variations, the catalyst can be at least 500 ppm relative to PPC. In another variation, the catalyst can be at least 1000 ppm relative to PPC. In another variation, the catalyst can be at least 1500 ppm relative to PPC. In another variation, the catalyst can be at least 2000 ppm relative to PPC. In another variation, the catalyst can be at least 2500 ppm relative to PPC. In another variation, the catalyst can be at least 3000 ppm relative to PPC. In another variation, the catalyst can be at least 3500 ppm relative to PPC. In another variation, the catalyst can be at least 4000 ppm relative to PPC.

In some variations, the catalyst can be less than or equal to 50000 ppm relative to PPC. In some variations, the catalyst can be less than or equal to 40000 ppm relative to PPC. In some variations, the catalyst can be less than or equal to 30000 ppm relative to PPC. In some variations, the catalyst can be less than or equal to 20000 ppm relative to PPC. In some variations, the catalyst can be less than or equal to 10000 ppm relative to PPC. In some variations, the catalyst can be less than or equal to 5000 ppm relative to PPC. In some variations, the catalyst can be less than or equal to 4000 ppm relative to PPC. In some variations, the catalyst can be less than or equal to 3500 ppm relative to PPC. In some variations, the catalyst can be less than or equal to 3000 ppm relative to PPC. In some variations, the catalyst can be less than or equal to 2500 ppm relative to PPC. In some variations, the catalyst can be less than or equal to 2000 ppm relative to PPC. In some variations, the catalyst can be less than or equal to 1500 ppm relative to PPC. In some variations, the catalyst can be less than or equal to 1000 ppm relative to PPC. In some variations, the catalyst can be less than or equal to 500 ppm relative to PPC.

The $T_{dec}$ can be represented at different levels of PPC decomposition, or amounts of PPC remaining in a composition. The point at which 85 wt %, 50 wt %, and 5 wt % of PPC remains at a heating rate of 10° C./minute can be measured for each composition. For example, the $T_{dec}$ can be represented at 85 wt % PPC remaining ($T_{dec}$-85), 50 wt % PPC remaining ($T_{dec}$-50), and 5 wt % PPC remaining ($T_{dec}$-5).

In the decomposition measurements herein, the measured material was heated to and held at 60° C. for a period of one hour. The materials were then heated to 65° C., and the wt % of PPC was measured. The amount of PPC was normalized to the wt % of PPC at 65° C. The material was heated at 10° C./min, and the wt % of PPC was measured.

In some instances the $T_{dec}$-85, $T_{dec}$-50, and $T_{dec}$-5 of PPC and a catalyst are less than the $T_{dec}$ of PPC in the absence of a catalyst. In some instances the $T_{dec}$-85 and $T_{dec}$-50 can be at a lower temperature than for PPC without a catalyst, and $T_{dec}$-5 can remain at the temperature without a catalyst.

Figure 2A:
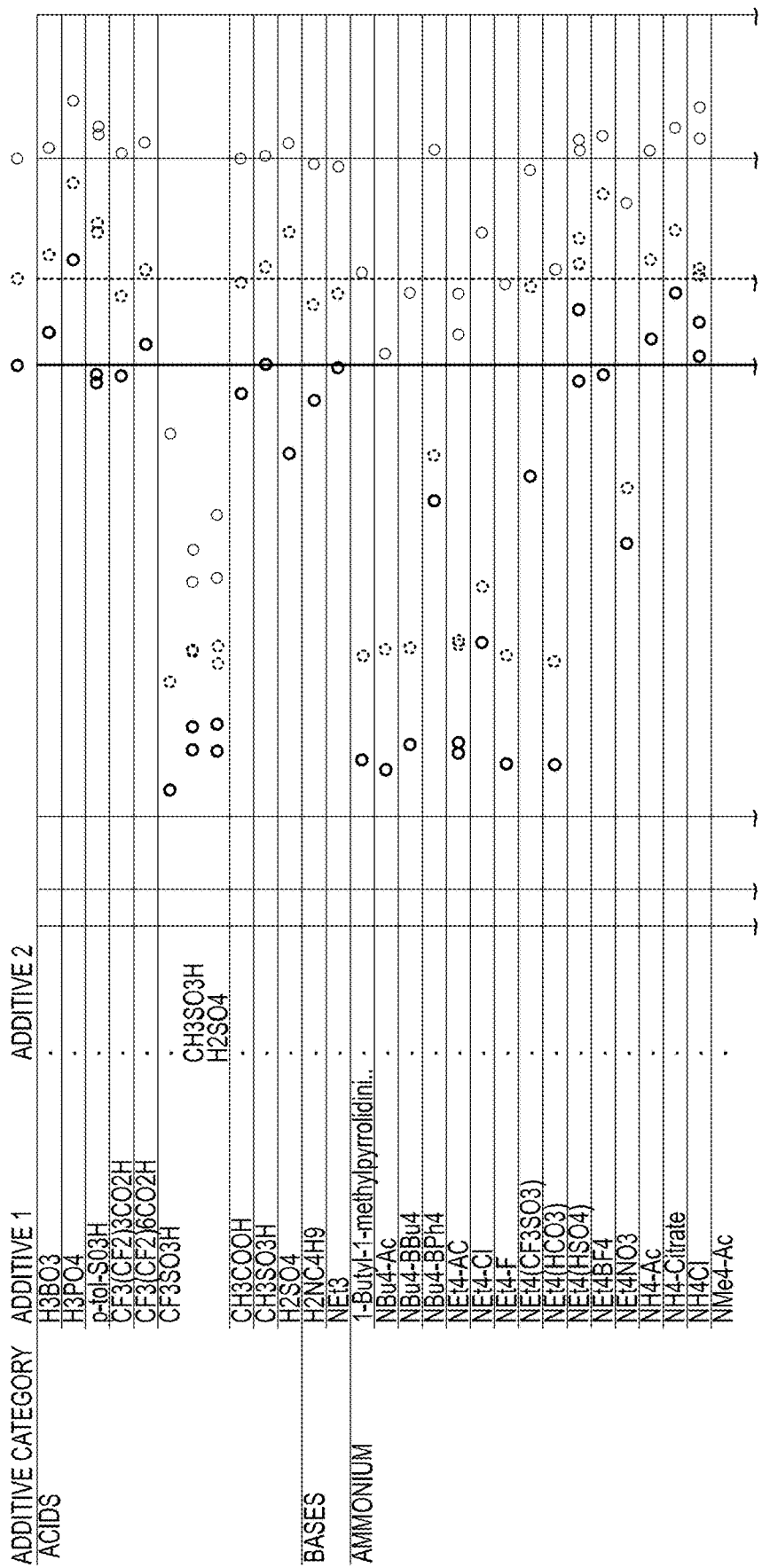
FIG. 2A and FIG. 2A-1 depict the PPC $T_{dec}$ when combined with 3,000 ppm of certain acid, phase transfer (ammonium and phosphonium), and metal salt additives at 85%, 50%, and 5% of PPC when the composition is heated at a 10° C. per minute ramp rate, according to some illustrative embodiments.
Figures 1, 2A:
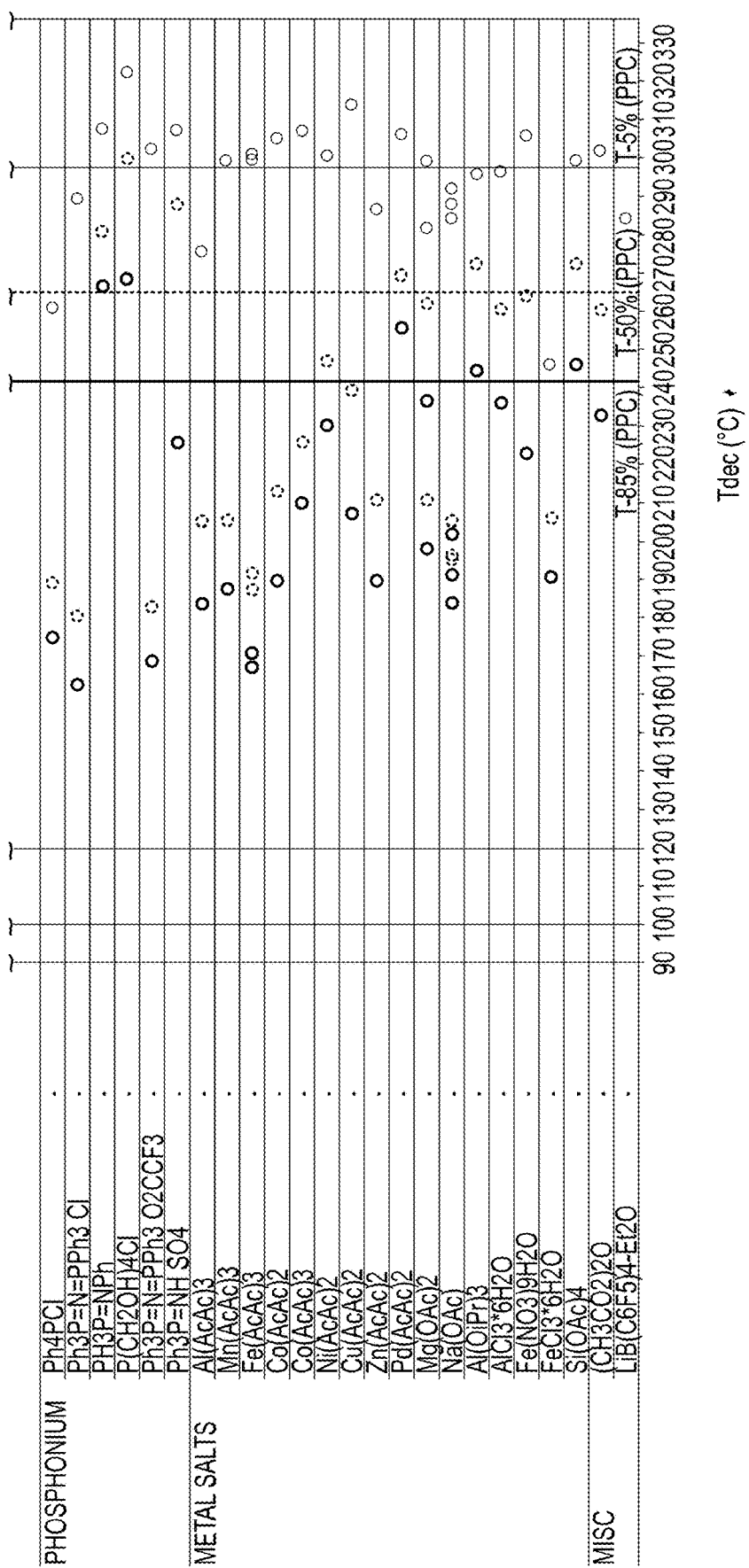

In various aspects, the catalysts can include compounds from acids, phase transfer catalysts, and metallic salts. FIGS. 2A and 2A-1 depict the $T_{dec}$ for catalysts including each of these categories.

The $T_{dec}$ of the PPC combined with catalyst is reduced when 85 wt % PPC remains in the composition. In some variations, $T_{dec}$-85 is no greater than 100° C. In some variations, $T_{dec}$-85 is no greater than 120° C. In some variations, $T_{dec}$-85 is no greater than 130° C. In some variations, $T_{dec}$-85 is no greater than 140° C. In some variations, $T_{dec}$-85 is no greater than 150° C. In some variations, $T_{dec}$-85 is no greater than 160° C. In some variations, $T_{dec}$-85 is no greater than 180° C. In some variations, $T_{dec}$-85 is no greater than 200° C.

The $T_{dec}$ of the PPC combined with catalyst is reduced when 50 wt % PPC remains in the composition In some variations, $T_{dec}$-50 is no greater than 120° C. In some variations, $T_{dec}$-50 is no greater than 140° C. In some variations, $T_{dec}$-50 is no greater than 160° C. In some variations, $T_{dec}$-50 is no greater than 180° C. In some variations, $T_{dec}$-50 is no greater than 200° C. In some variations, $T_{dec}$-50 is no greater than 240° C.

The $T_{dec}$ of the PPC combined with catalyst is reduced when 5 wt % PPC remains in the composition. In some variations, $T_{dec}$-5 is no greater than 200° C. In some variations, $T_{dec}$-5 is no greater than 220° C. In some variations, $T_{dec}$-5 is no greater than 240° C. In some variations, $T_{dec}$-5 is no greater than 260° C. In some variations, $T_{dec}$-5 is no greater than 280° C.

In some variations, the thermal conductivity of the composition when combined with a substrate and a fiber, and after PPC decomposition is less than or equal to 1.0 W/(m*K) at 298 K. In some variations, the thermal conductivity of decomposed PPC is less than or equal to 0.5 W/(m*K) at 298 K. In some variations, the thermal conductivity of decomposed PPC is less than or equal to 0.2 W/(m*K) at 298 K.

Different categories of catalysts are described below. In various non-limiting aspects, certain acids with pKa less than −1 showed full decomposition at reduced temperatures. Phase transfer and metal salts showed only 85-95% decomposition at reduced temperatures, followed by complete decomposition at temperatures near that of pure PPC.

In various aspects, more than one catalyst can be included in the composition. For example, a composition can include an acid catalyst, a phase transfer catalyst, and or a metal salt catalyst.

Acid Catalysts

In some variations, the catalyst is an acid with a pKa less than or equal to 1 in an aqueous solution. These acids catalyze the decomposition of PPC, resulting in a reduction in PPC $T_{dec}$.

As depicted in FIGS. 2A and 2A-1, the acid additives with pKas less than or equal to 1 catalyzed PPC degradation. Addition of 3000 ppm of $H_3BO_3$ resulted in an increased PPC $T_{dec}$. Addition of 3000 ppm of p-tol-$SO_3$ resulted in an increase in PPC $T_{dec}$-85, $T_{dec}$-50, and $T_{dec}$-5. Addition of 3000 ppm of $H_3PO_4$ resulted in slightly reduced $T_{dec}$-85, but an increased $T_{dec}$-50 and $T_{dec}$-5. Addition of 3000 ppm $CF_3(CF_2)_3CO_2H$ and $CF_3(CF_2)_6CO_2H$ resulted in a reduced $T_{dec}$-85 and $T_{dec}$-50, but a higher $T_{dec}$-5. Notably, triflic acid had a $T_{dec}$-5 lower than acids with higher pKas.

Figure 2B:
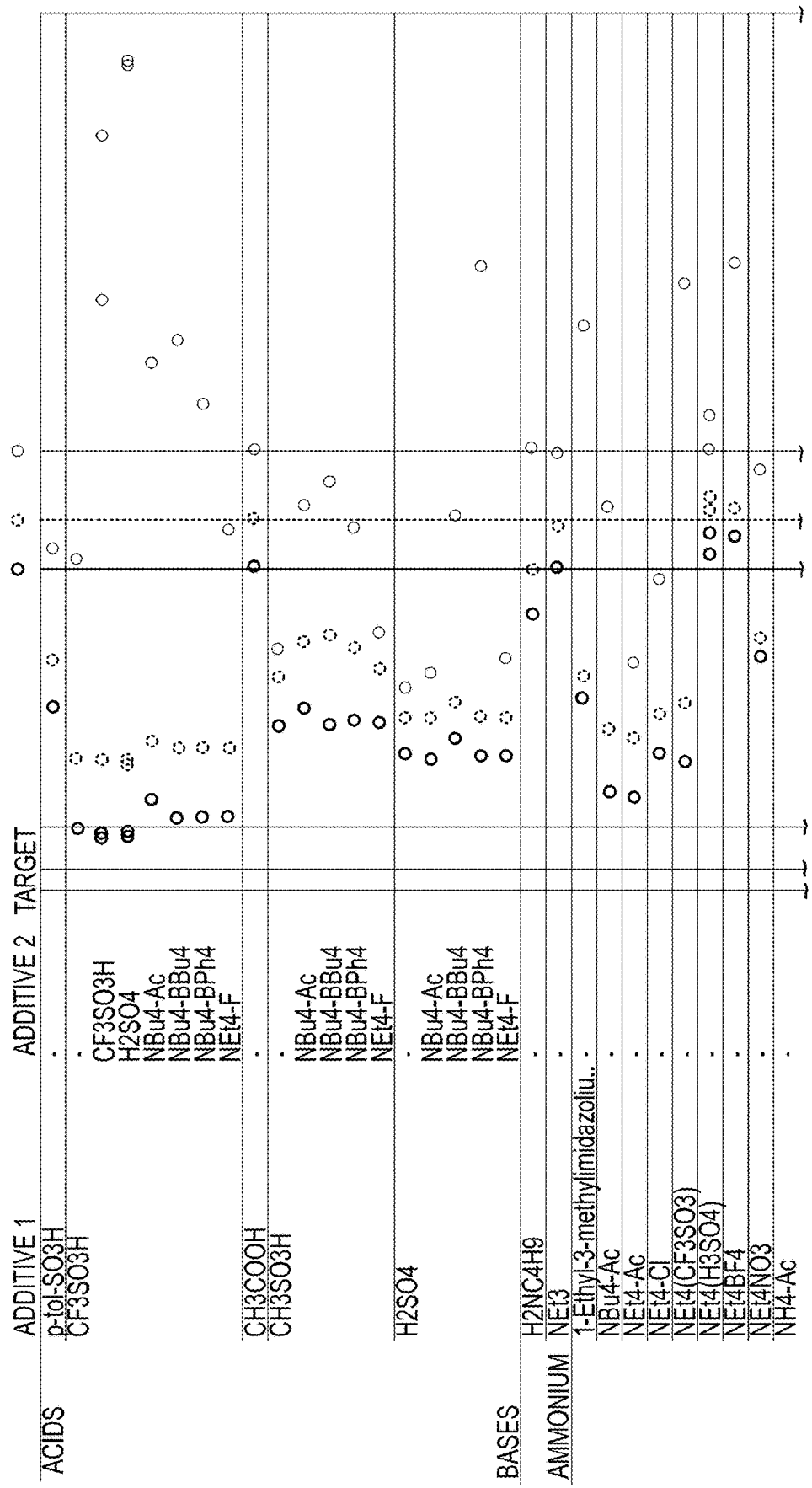
Figures 1, 2B:
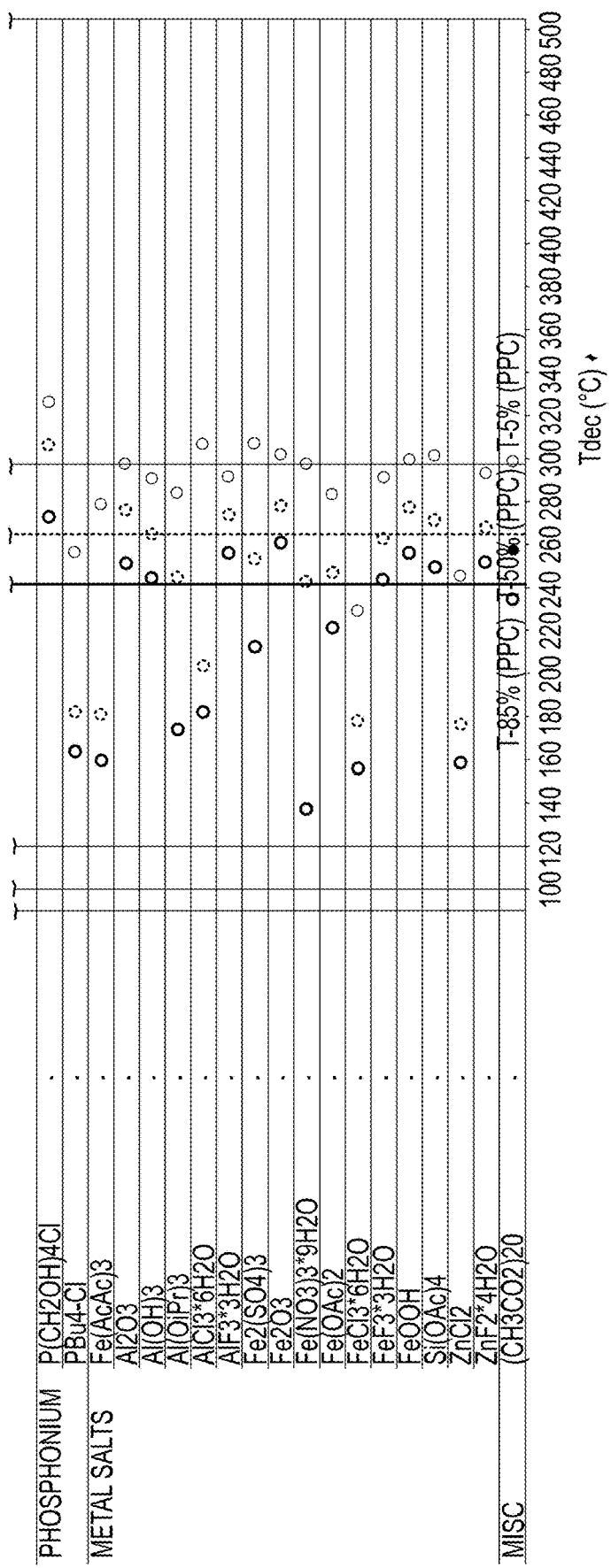

As depicted in FIGS. 2B and 2B-1, addition of 40,000 ppm of an additive results in decreased $T_{dec}$. Addition of 40,000 ppm of p-tol-$SO_3$ resulted in a decrease in PPC $T_{dec}$-85, $T_{dec}$-50, and $T_{dec}$-5, unlike the addition of 3000 ppm of p-tol-S03. Likewise, addition of 40,000 ppm of $CH_3SO_3H$ resulted in a decrease in PPC $T_{dec}$-85, $T_{dec}$-50, and $T_{dec}$-5, unlike the addition of 3000 ppm of $CH_3SO_3H$, which showed a negligible change compared to the absence of $CH_3SO_3H$. Addition of 40,000 ppm of $H_2SO_4$ resulted in a decrease in PPC $T_{dec}$-85, $T_{dec}$-50, and $T_{dec}$-5, unlike the addition of 3000 ppm of $H_2SO_4$ in which a negligible change resulted compared to the absence of $CH_3SO_3H$. Addition of 40,000 ppm of $CF_3SO_3H$ resulted in a decrease in PPC $T_{dec}$-85, $T_{dec}$-50, and $T_{dec}$-5. In the measured sample, $T_{dec}$-85 and $T_{dec}$-50 were lower than in the 3000 ppm sample, while $T_{dec}$-5 was slightly higher.

Non-limiting examples of acid catalysts include $CH_3SO_3H$ (methanesulfonic acid, aqueous pKa ~−2.6), p-tol-$SO_3H$ (p-tolulenesulfonic acid, aqueous pKa ~−2.8), $CF_3(CF_2)_3CO_2H$ (perfluoropentanoic acid, aqueous pKa ~0.4), $CF_3(CF_2)_6CO_2H$ (perfluorooctanoic acid, aqueous pKa ~0), sulfuric acid (aqueous pKa ~−3), perchloric acid (aqueous pKa ~−10), and $CF_3SO_3H$ (triflic acid, aqueous pKa ~−14).

In various aspects, the acids have a pKa of equal to or below a give value. In some variations, the pKa of the acid catalyst is less than or equal to 1 in water. In some variations, the pKa of the acid catalyst is less than or equal to 0 in water. In some variations, the pKa of the acid catalyst is less than or equal to −2 in water. In some variations, the pKa of the acid catalyst is less than or equal to −5 in water. In some variations, the pKa of the acid catalyst is less than or equal to −10 in water.

In some variations, the $T_{dec}$-85 of PPC with an acid catalyst is no greater than 120° C. In some variations, the $T_{dec}$-85 of PPC with an acid catalyst is no greater than 130° C. In some variations, the $T_{dec}$-85 of PPC with an acid catalyst is no greater than 140° C. In some variations, the $T_{dec}$-85 of PPC with an acid catalyst is no greater than 150° C. In further variations, the $T_{dec}$-50 an acid catalyst is no greater than 160° C. In some variations, the $T_{dec}$-50 of PPC with an acid catalyst is no greater than 170° C. In some variations, the $T_{dec}$-50 of PPC with an acid catalyst is no greater than 180° C. In some variations, the $T_{dec}$-50 of PPC with an acid catalyst is no greater than 190° C. In some variations, the $T_{dec}$-5 of PPC with an acid catalyst is no greater than 220° C. In some variations, the $T_{dec}$-5 of PPC with an acid catalyst is no greater than 230° C. In some variations, the $T_{dec}$-5 of PPC with an acid catalyst is no greater than 240° C. In some variations, the $T_{dec}$-5 of PPC with an acid catalyst is no greater than 250° C.

The stronger acids result in improved catalytic properties and a lower $T_{dec}$. Triflic acid, the strongest of the acids, has a lower $T_{dec}$ as compared to the other acids at $T_{dec}$-5%, $T_{dec}$-50%, and $T_{dec}$-85%. The $T_{dec}$-85 of PPC combined with triflic acid was 127° C. The $T_{dec}$-50 of PPC combined with triflic acid was 156° C. The $T_{dec}$-5 of PPC combined with triflic acid was 223° C. The stronger the acid, the greater the reduction in $T_{dec}$.

As the concentration of acid increases, the effectiveness of the catalyst on reducing the $T_{dec}$ can increase. Increasing the concentration of acid catalyst from 1000 ppm, 2000 ppm PPC, to 3000 ppm of PPC resulted in reduced decomposition temperatures of PPC for all acids.

Phase Transfer Catalysts

In some variations, the composition is a phase transfer catalyst. Phase transfer catalysts are compounds that carry a component from one phase to another phase. In various embodiments, the phase transfer catalyst can be quaternary ammonium salt (i.e., $NR^1_4X$) or a non-hydrogen containing phosphonium-derivative salt (e.g., $PR^2_4X$, $PR^2_4$=N—Y, or $PR^2_4$=N=Z).

In various aspects, in $NR^1_4X$ each $R^1$ can be the same or different, and can be one or more of alkyl (e.g., methyl, ethyl, propyl, or butyl), substituted alkyl, aryl (e.g., phenyl or benzyl), or substituted aryl. In more specific variations, the $NR^1_4$ cation can be $NBu_4$, $NEt_4$, or $NMe_4$.

In various aspects, in $PR^2_4X$, $PR^2_2$=N=P $R^2_2$, or P $R^2_2$=N—$PR^2$, each $R^2$ can be the same or different, and can be one or more of alkyl (e.g., methyl, ethyl, propyl, or butyl), substituted alkyl, aryl, or substituted aryl. Alternatively, each $R^2$ can be the same or different, and can be one or more of aryl or substituted aryl. Without wishing to be limited, each $R^2$ is not hydrogen or does not include a labile hydrogen.

X can be any anion. In some variations, the anion X can be selected from a variety of substituents. For example, in some variations, X can be selected from substituted alkyl, acyl, alkoxy, carboxylate, $BZ_4$ (where Z can be alkyl, substituted alkyl, aryl, or substituted aryl), bicarbonate, carboxylate, bisulfate, nitrate, alcohol, or halide. In more specific variations, X can be acetate, acetate-acetate, $BBu_4$, $BPh_4$, $CF_3SO_3$, $HCO_3$, $HSO_4$, $BF_4$, $NO_3$, Citrate, or Cl. In certain variations, the phase transfer catalyst is tetrabutyl ammonium acetate (TBA-Ac) or tetraethylammonium acetate (TEA-Ac).

As used herein, "alkyl" refers to a saturated or unsaturated, branched, or straight-chain, monovalent hydrocarbon radical derived by the removal of one hydrogen atom from a single carbon atom of a parent alkane, alkene, or alkyne.

As used herein, "acyl" by itself or as part of another substituent refers to a radical —C(O)$R_1$, where $R_1$ is hydrogen or another substituent.

As used herein, "alkoxy" by itself or as part of another substituent refers to the radical —$OR_2$, where $R_2$ represents a substituted or unsubstituted alkyl or cycloalkyl group. Representative examples include, but are not limited to, methoxy, ethoxy, propoxy, butoxy, and the like.

As used herein, "aryl" refers to a monovalent aromatic hydrocarbon radical derived by the removal of one hydrogen atom from a single carbon atom of a parent aromatic ring system. Aryl encompasses monocyclic rings, bicyclic ring systems, and other multiple ring systems having at least one carbocyclic aromatic ring fused to at least one carbocyclic aromatic ring, cycloalkyl ring, or heterocycloalkyl ring.

As used herein, "substituted" refers to a group in which one or more hydrogen atoms are independently replaced with the same or different substituent group(s). In certain embodiments, each substituent group is independently chosen from halogen, —OH, —CN, —$CF_3$, =O, —$NO_2$, benzyl, —C(O)$NH_2$, —$R_3$, —$OR_3$, —C(O)$R_3$, —COO$R_3$, and —$NR^{11}_2$ wherein each $R^{11}$ is independently chosen from hydrogen and $C_{1-4}$ alkyl. In certain embodiments, each substituent group is independently chosen from halogen, —OH, —CN, —$CF_3$, —$NO_2$, benzyl, —$R_3$, —$OR_3$, and —N($R_3$)$_2$ wherein each $R^{11}$ is independently chosen from hydrogen and $C_{1-4}$ alkyl. In certain embodiments, each substituent group is independently chosen from halogen, —OH, —CN, —$CF_3$, =O, —$NO_2$, benzyl, —C(O)N($R_3$)$_2$, —$R_3$, —$OR_3$, —C(O)$R_3$, —COO$R_3$, and —N($R_3$)$_2$ wherein each $R_3$ is independently chosen from hydrogen and $C_{1-4}$ alkyl. In certain embodiments, each substituent group is independently chosen from —OH, $C_{1-4}$ alkyl, and —$NH_2$.

Turning again to FIGS. 2A and 2A-1, a series of quaternary ammonium salts and resulted in a reduced PPC $T_{dec}$ at several temperatures. Combining 3000 ppm of 1-butyl-1-methylpyrrolidine, $NBu_4$-acetate, $NBu_4$-$BBu_4$, $NEt_4$-acetate, $NEt_4$-F, $NEt_4$-$HCO_3$, $NEt_4$-$NO_3$, or $NMe_4$-acetate with PPC resulted in a substantial reduction in $T_{dec}$-85, $T_{dec}$-50, and $T_{dec}$-5. $NEt_4$-Cl showed a substantial reduction in $T_{dec}$-85 and $T_{dec}$-50, and a slight reduction in $T_{dec}$-5. $NBu_4$-$BPh_4$ had a substantial reduction in $T_{dec}$-85 and $T_{dec}$-50, but a slightly increased $T_{dec}$-5. $NEt_4$-$CF_3SO_3$ showed a substantial reduction in $T_{dec}$-85, but a negligible reduction in $T_{dec}$-50 and $T_{dec}$-5. $NEt_4$-$HSO_4$ showed no substantial change in in any of $T_{dec}$-85, $T_{dec}$-50, and $T_{dec}$-5. In contrast, $NEt_4$-$BF_4$ showed no change in $T_{dec}$-85, and an actual increase in $T_{dec}$-50 and $T_{dec}$-5.

In contrast to quaternary ammonium salts ammonium salt additives showed no reduction in PPC $T_{dec}$. In particular, NH$_4$-acetate, NH$_4$-citrate, and NH$_4$ chloride all increased, not decreased, T$_{dec}$-85, T$_{dec}$-50, and T$_{dec}$-5. Without wishing to be limited to any particular mechanism or mode of action, ammonia does not act as a phase-transfer catalyst.

With respect to FIGS. 2B and 2B-1, when 40,000 ppm of NBu$_4$-acetylate, NBu$_4$-BBu$_4$ or NEt$_4$-acetate were added to PPC, the T$_{dec}$-5 was than when 3000 ppm was added.

Turning again to FIGS. 2A and 2A-1, 3000 ppm of various phosphonium-derivative salts show a decrease in T$_{dec}$. Specifically, introduction of 3000 ppm of Ph$_4$PCl, Ph$_3$P=N=PPh$_3$ Cl, or Ph$_3$P=N=PPh$_3$O$_2$CCF$_3$ resulted in a substantial reduction in T$_{dec}$-85, T$_{dec}$-50, and T$_{dec}$-5.

Notably, the addition of 3000 ppm of the phosphonium-derivatives Ph$_3$P=NPh and P(CH$_2$OH)$_4$Cl resulted in an increased T$_{dec}$-85, T$_{dec}$-50, and T$_{dec}$-5. Further, Ph$_3$P=NH SO$_4$ resulted in a slightly decreased T$_{dec}$-85 but increased T$_{dec}$-50 and T$_{dec}$-5.

In some variations, the T$_{dec}$-85 of PPC with a phase transfer catalyst is no greater than 120° C. In some variations, the T$_{dec}$-85 of PPC with a phase transfer catalyst is no greater than 130° C. In some variations, the T$_{dec}$-85 of PPC of PPC with a phase transfer catalyst is no greater than 140° C. In further variations, the T$_{dec}$-50 of PPC with a phase transfer catalyst is no greater than 160° C. In some variations, the T$_{dec}$-50 of PPC with a phase transfer catalyst is no greater than 200° C. In some variations, the T$_{dec}$-5 of PPC with a phase transfer catalyst is no greater than 240° C. In some variations, the T$_{dec}$-5 of PPC with a phase transfer catalyst is no greater than 260° C. In some variations, the T$_{dec}$-5 of PPC with a phase transfer catalyst is no greater than 280° C.

Figure 4:
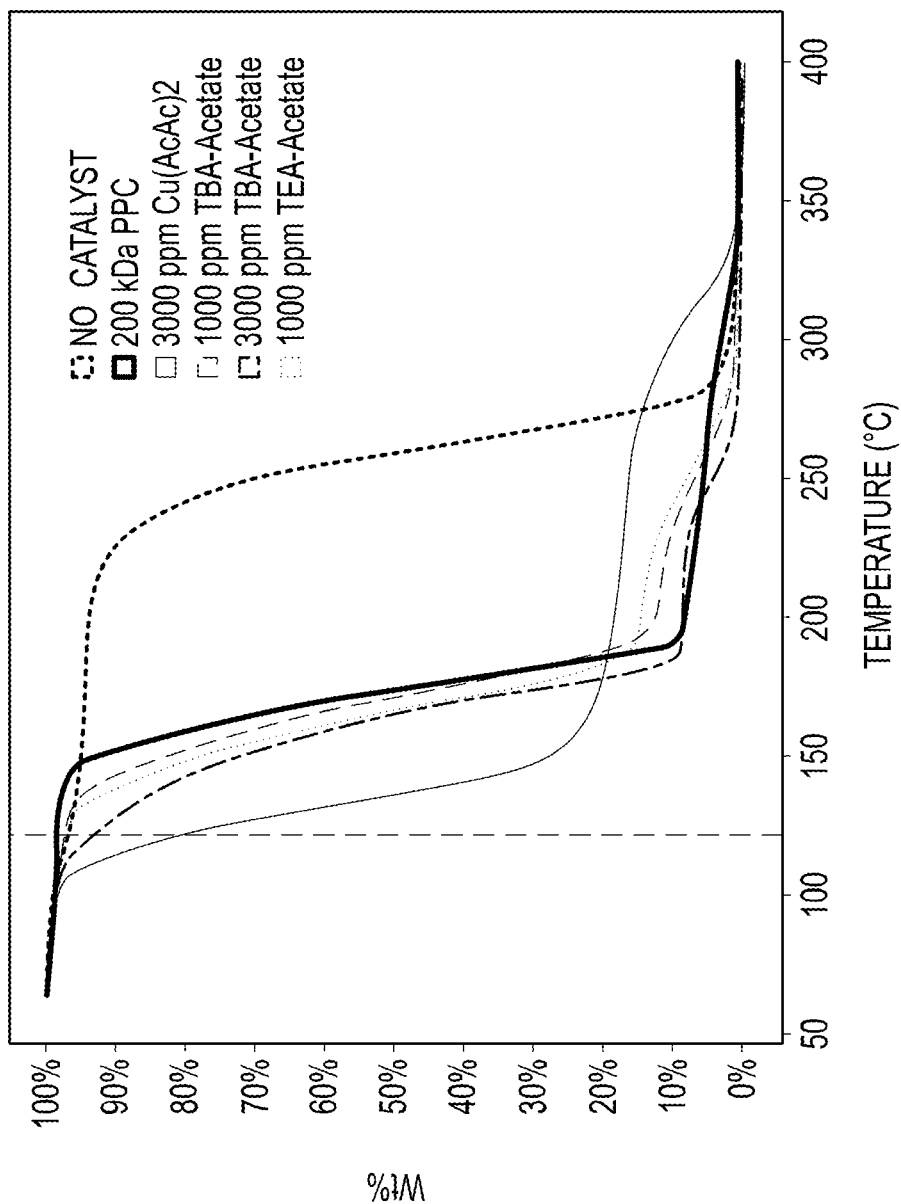
FIG. 4 depicts the wt % of a negative control including PPC with no catalyst, and PPC combined with different catalysts and heated at a 10° C./minute ramp rate.

FIG. 4 depicts the wt % of a negative control, PPC, and PPC combined with different catalysts, when heated a 10° C. per minute ramp rate. The negative control had a decomposition temperature beginning above 200° C. Compositions including 200 kDa PPC with 1000 ppm of TBA-Acetate show lower PPC T$_{dec}$ than PPC alone, and 200 kDa PPC with 3000 ppm of TBA-Acetate shows a still lower T$_{dec}$.

As further depicted in FIG. 4, the ammonium-alkyl compounds catalyzed decomposition, leaving to 5-15% PPC un-decomposed. The remaining PPC remained undecomposed over a temperature range, unlike the full PPC decomposition observed with acid catalysts.

Metal Salt Catalysts

In some variations, the catalyst is a metal salt. Examples of metals that serve as the cation of the metal salt include Al, Fe, Co, Ni, Cu, Ni, Zn, and Pd. In some variations, the cation of the metal salt is selected from Al, Fe, and Zn. The anion of the metal salt can be selected from several anions known in the art, including acetate, acetylacetonate (e.g., bicarbonate), and chloride ligands. In many instances, the metal salt can be a transition metal salt. Non-limiting examples of metal salts include Al(AcAc)$_3$, Mn(AcAc)$_3$, Fe(AcAc)$_3$, Co(AcAc)$_2$, Co(AcAc)$_3$, Ni(AcAc)$_3$, Cu(AcAc)$_3$, Zn(AcAc)$_3$, Pd(AcAc)$_3$, Mg(OAc)$_2$, Na(OAc), Al(OiPr)$_3$, AlCl$_3$*6H$_2$O, Fe(NO$_3$)$_3$*9H$_2$O, FeCl$_3$*6H$_2$O, Si(OAc)$_4$. In more specific aspects, the metal catalyst can be selected from Fe(AcAc)$_3$, Al(AcAc)$_3$, and Zn(AcAc)$_2$.

Returning to FIGS. 2A and 2A-1, a series of metal salts resulted in a reduced PPC T$_{dec}$ at several temperatures. Specifically, introduction of 3000 ppm of Al(AcAc)$_3$, Mn(AcAc)$_3$, Fe(AcAc)$_3$, Co(AcAc)$_2$, Co(AcAc)$_3$, Ni(AcAc)$_3$, Cu(AcAc)$_3$, Mg(OAc)$_2$, Na(OAc), and FeCl$_3$*6H$_2$O each resulted in a substantial reduction in T$_{dec}$-85 and T$_{dec}$-50, while T$_{dec}$-5 did not show any decrease. Only Zn(AcAc)$_3$ showed a reduction in T$_{dec}$-85, T$_{dec}$-50 and T$_{dec}$-5. Al(OiPr)$_3$ and AlCl$_3$*6H$_2$O showed no substantial change in in any of T$_{dec}$-85, T$_{dec}$-50, and T$_{dec}$-5. Pd(AcAc)$_3$ and Si(OAc)$_4$ showed an increase in T$_{dec}$-85, T$_{dec}$-50 and T$_{dec}$-5. Fe(NO$_3$)$_3$*9H$_2$O showed a slight decrease in T$_{dec}$-85, no change in T$_{dec}$-50, and an increase in T$_{dec}$-5.

Figure 5:
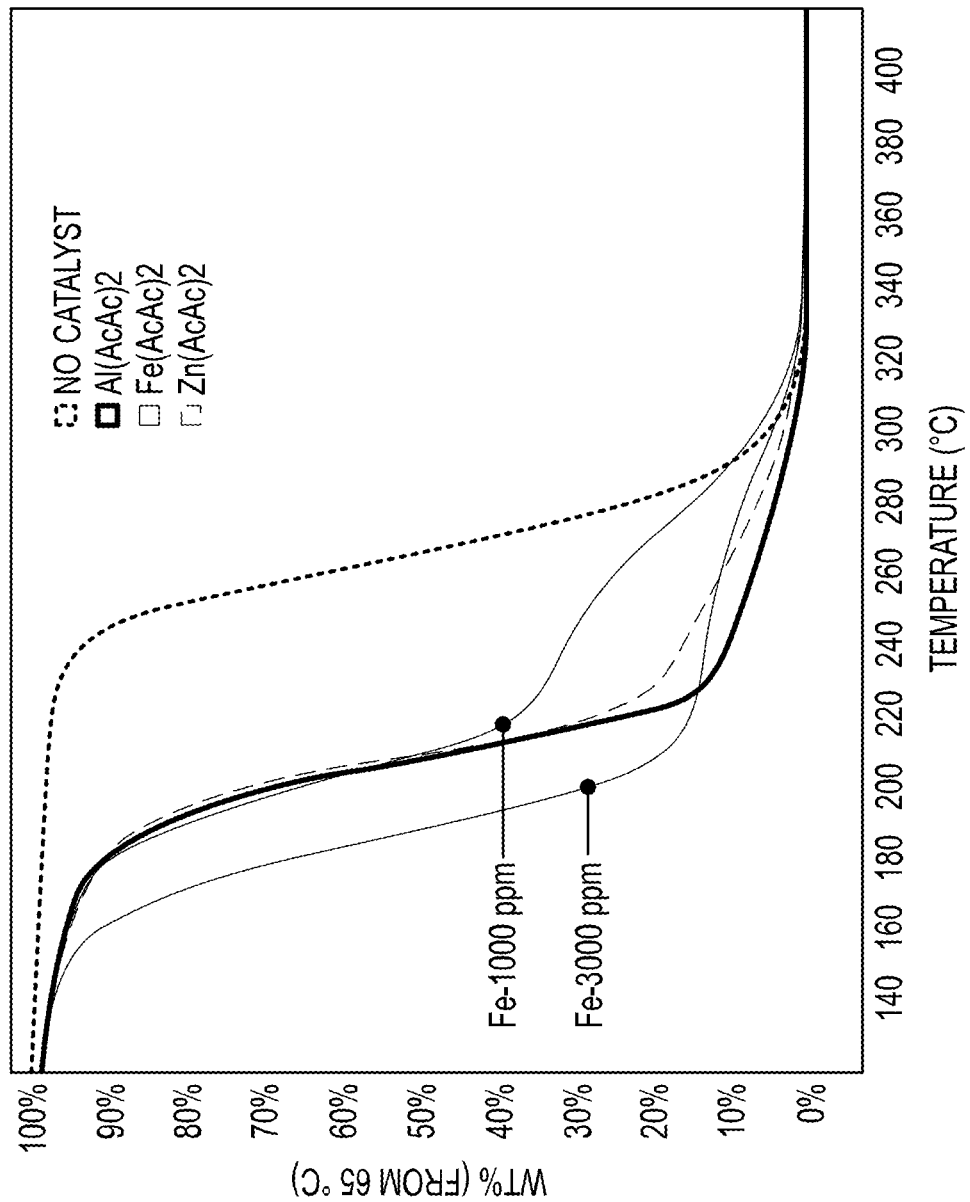
FIG. 5 depicts the wt % PPC as a function of temperature of a control without catalyst, PPC combined with 1000 ppm $Fe(AcAc)_3$, PPC combined with 3000 ppm $Fe(AcAc)_3$, PPC combined with 1000 ppm $Al(AcAc)_3$, and PPC combined with 1000 ppm $Zn(AcAc)_2$ and heated at a 10° C./minute ramp rate, according to some illustrative embodiments.

FIG. 5 shows the wt % PPC as a function of temperature of a control without catalyst, PPC combined with 1000 ppm Fe(AcAc)$_3$, 3000 ppm Fe(AcAc)$_3$, 1000 ppm Al(AcAc)$_3$, and 1000 ppm Zn(AcAc)$_2$. The T$_{dec}$ of PPC at 3000 ppm Fe(AcAc)$_3$ was substantially lower than 1000 ppm Fe(AcAc)$_3$. In various aspects, higher quantity catalyst results in a lower the T$_{dec}$.

Transition metals decrease T$_{dec}$ at a high wt %. The decrease in T$_{dec}$ is highly sensitive to concentration. The 3000 ppm Fe(AcAc)$_3$ catalyst resulted in a substantial reduction in PPC T$_{dec}$ than the 1000 ppm Fe(AcAc)$_3$ catalyst. This suggests that increasing the quantity of transition metal catalysts increases PPC decomposition. However, the observed metal salt catalysts at 3000 ppm in particular resulted in a lower initial PPC T$_{dec}$, but a longer tail of undecomposed PPC, resulting in full decomposition at a substantially higher temperature.

Without wishing to be limited to a particular mechanism or mode of action, the cation can function to transfer the anion or another reactive impurity into the polymer bulk. In such instances, improving the solubility of the cation or reactivity of the anion facilitates lower T$_{dec}$ of the PPC.

In some variations, the T$_{dec}$-85 of PPC with a metal catalyst is no greater than 160° C. In some variations, the T$_{dec}$-85 of PPC with a metal catalyst is no greater than 180° C. In some variations, the T$_{dec}$-85 of PPC of PPC with a metal catalyst is no greater than 200° C. In further variations, the T$_{dec}$-50 of PPC with a metal catalyst is no greater than 180° C. In some variations, the T$_{dec}$-50 of PPC with a metal catalyst is no greater than 200° C. In some variations, the T$_{dec}$-50 of PPC with a metal catalyst is no greater than 220° C. In some variations, the T$_{dec}$-5 of PPC with a metal catalyst is no greater than 260° C. In some variations, the T$_{dec}$-5 of PPC with a metal catalyst is no greater than 280° C. In some variations, the T$_{dec}$-5 of PPC with a metal catalyst is no greater than 300° C.

In particular, metals can decrease the PPC T$_{dec}$ more effectively for high molecular weight PPCs. Further, PPC catalysis and corresponding reduction in T$_{dec}$ are sensitive to sensitive to concentration. Higher concentrations of catalyst result in reduced catalytic effect.

It will be noted that, in various non-limiting aspects, the metal catalysts do not induce cross-linking of PPC. That is, the metal catalysts do not cause crosslinking between PPC chains. Cross-linking PPC results in increasing the T$_{dec}$ of PPC.

Multiple Catalysts

In some variations, the composition can include more than one catalyst. In some variations, the composition can include a catalyst from multiple categories. For example, the composition can include an acid catalyst and a phase-transfer catalyst, an acid catalyst and a metal catalyst, or a phase transfer catalyst and a metal catalyst. It will be recognized that the catalysts can have different mechanism of action, so that the catalytic activity of multiple catalysts can be additive.

Turning to FIGS. 2B and 2B-1, combinations of 40,000 ppm of acids and an additional additive are depicted. The combination of two additives can result in the reduction of at least T$_{dec}$-85 and T$_{dec}$-50. The combination of CF$_3$SO$_3$H with CH$_3$SO$_3$H or sulfuric acid resulted in a decreased T$_{dec}$-85 and T$_{dec}$-50, but an increased T$_{dec}$-5. Likewise, combination of CF$_3$SO$_3$H with NBu$_4$-acetate, NBu$_4$-BBu$_4$, NEt$_4$-acetate, and NEt$_4$-F resulted in decreased T$_{dec}$-85 and T$_{dec}$-50, but an increased T$_{dec}$-5. The combination of CH$_3$SO$_3$H with NBu$_4$-acetate, NBu$_4$-BBu$_4$, NEt$_4$-acetate, and NEt$_4$-F resulted in decreased T$_{dec}$-85 and T$_{dec}$-50, but an increased T$_{dec}$-5. The combination of H$_2$SO$_4$ with NBu$_4$-acetate, NBu$_4$-BBu$_4$, and NEt$_4$-F resulted in a decrease of all of T$_{dec}$-85, T$_{dec}$-50, and T$_{dec}$-5. The combination of H$_2$SO$_4$ with NEt$_4$-acetate. The increased T$_{dec}$-5 is in contrast to the reduction in all of T$_{dec}$-85, T$_{dec}$-50, and T$_{dec}$-5 when 40,000 ppm of p-tol-SO$_3$H or CF$_3$SO$_3$H were used.

Increased T$_{dec}$-5 series of ammonium salts resulted in a reduced PPC T$_{dec}$ at several temperatures. Specifically, introduction of 3000 ppm of 1-butyl-1-methylpyrrolidine, NBu$_4$-acetate, NBu$_4$-BBu$_4$, NEt$_4$-acetate, NEt$_4$-F, NEt$_4$-HCO$_3$, NEt$_4$-NO$_3$, or NMe$_4$-acetate resulted in a substantial reduction in T$_{dec}$-85, T$_{dec}$-50, and T$_{dec}$-5. NEt$_4$-Cl showed a substantial reduction in T$_{dec}$-85 and T$_{dec}$-50, but a slight reduction in T$_{dec}$-5. NBu$_4$-BPh$_4$ had a substantial reduction in T$_{dec}$-85 and T$_{dec}$-50, but a slightly increased T$_{dec}$-5. NEt$_4$-CF$_3$SO$_3$ showed a substantial reduction in T$_{dec}$-85, but a negligible reduction in T$_{dec}$-50 and T$_{dec}$-5. NEt$_4$-HSO$_4$ showed no substantial change in in any of T$_{dec}$-85, T$_{dec}$-50, and T$_{dec}$-5. NEt$_4$-BF$_4$ showed no change in T$_{dec}$-85, and an actual increase in T$_{dec}$-50 and T$_{dec}$-5. Non-limiting examples of acid catalysts include CH$_3$SO$_3$H (methanesulfonic acid, aqueous pKa ~−2.6), p-tol-SO$_3$H (p-toluenesulfonic acid, aqueous pKa ~−2.8), CF$_3$(CF$_2$)$_3$CO$_2$H (perfluoropentanoic acid, aqueous pKa ~0.4), CF$_3$(CF$_2$)$_6$CO$_2$H (perfluorooctanoic acid, aqueous pKa 0), sulfuric acid (aqueous pKa ~−3), perchloric acid (aqueous pKa ~−10), and CF$_3$SO$_3$H (triflic acid, aqueous pKa ~−14).

Substrates

The composition, PPC, and/or catalyst can be disposed on a substrate. In some examples, the composition, PPC, and/or catalyst is adsorbed onto a substrate. In some examples, the catalyst and/or PPC can be adhered to the substrate. In some examples, the catalyst and/or PPC can be chemically bonded to the substrate. In some further examples, the catalyst and/or PPC can be chemabsorbed onto the substrate surface, while in other variations the catalyst and/or PPC can be thermally or acid reacted with the substrate.

Any substrate material can be used. Non-limiting examples of the substrate can include SiO$_2$ (e.g., fumed silica), Al$_2$O$_3$, ZrO$_2$, and MgO. In some variations, the substrate-supported catalysts can be compounded with PPC.

In some variations, the substrate can be an inorganic thermally-insulating material. The substrate can form a porous structure. In some variations, the substrate can be formed of particles that contain pores (e.g., aerogels). In some variations, the catalyst can be disposed on the substrate. In some variations, the PPC can be disposed within the porous structure.

In some variations, the substrate can have a porous structure with a mean pore diameter. In some variations, the mean pore diameter is equal to or less than 500 nm. In further variations, the mean pore diameter is equal to or less than 200 nm. In further variations, the mean pore diameter is equal to or less than 100 nm. In further variations, the mean pore diameter is equal to or less than 50 nm. In further variations, the mean pore diameter is equal to or less than 20 nm.

The substrate can reduce or prevent the degree or likelihood that composition components can react with other materials. For example, acid catalysts can corrode or degrade metallic material that is in contact with the composition. Adsorbing the PPC onto a substrate (e.g., silica) can reduce or eliminate this effect.

Examples of substrates include silica (e.g., fumed silica), zirconia, ceramics (e.g., titanium dioxide), insulative fiber products, and mica. Other materials are also possible. In some aspects, the substrate includes ceramic nanoparticles. Such ceramic nanoparticles can include materials such as silica (e.g., fumed silica or silica aerogel), titania, alumina, or zirconia. In some variations, the ceramic nanoparticles have an average BET surface area of at least 100 m$^2$/g.

In some variations, the substrate can be formed of a material having a bulk thermal conductivity equal to or lower than the bulk thermal conductivity of silicon dioxide at a temperature between 600-1000° C. The substrate can be formed of Y-stabilized ZrO$_2$, Gd$_3$Zr$_2$O$_7$, and doped versions of these bulk compositions.

In some aspects, the substrate can be formed of thermally-insulating nanoparticles having an average diameter of 1 micron or less. In some embodiments, an average diameter of the thermally-insulating nanoparticles is 500 nm or less. In some embodiments, an average diameter of the thermally-insulating nanoparticles is 100 nm or less. In some embodiments, an average diameter of the thermally-insulating nanoparticles is 50 nm or less. In some embodiments, an average diameter of the thermally-insulating nanoparticles is 20 nm or less.

In such variations, an average thermally-insulating nanoparticle diameter can be at least 100 nm. In some variations, an average thermally-insulating nanoparticle diameter can be at least 250 nm. In some variations, an average thermally-insulating nanoparticle diameter can be at least 400 nm.

In some aspects, the substrate particles can have an average BET surface area of at least 100 m$^2$/g. In some aspects, the substrate particles can have an average BET surface area of at least 150 m$^2$/g. In some aspects, the substrate particles can have an average BET surface area of at least 200 m$^2$/g. In some aspects, the substrate is at least 5 vol. % of the insulator. In some aspects, the substrate is at least 10 vol. % of the insulator. In some aspects, the substrate is at least 15 vol. % of the insulator. In some aspects, the substrate is at least 20 vol. % of the insulator. In some aspects, the substrate is at least 25 vol. % of the insulator. In some aspects, the substrate is at least 30 vol. % of the insulator.

The insulator can have a measurable density after PPC decomposition. In some variations, the insulator has a density of at least 0.1 g/mL after PPC decomposition. In some variations, the insulator has a density of at least 0.15 g/mL after PPC decomposition. In some variations, the insulator has a density of at least 0.2 g/mL after PPC decomposition. In some variations, the insulator has a density of at least 0.3 g/mL after PPC decomposition. In some variations, the insulator has a density of at least 0.35 g/mL after PPC decomposition. In some variations, the insulator has a density of at least 0.4 g/mL after PPC decomposition. In some variations, the insulator has a density of at least 0.5 g/mL after PPC decomposition. In some variations, the insulator has a density of at least 0.6 g/mL after PPC decomposition. In some variations, the insulator has a density of at least 0.7 g/mL after PPC decomposition.

When the substrate is a thermally-insulating nanoparticle, the average diameter of the thermally-insulating nanoparticles is about 13 nm. In some aspects, the particle size distribution of the thermally-insulating nanoparticles can be multi-modal, having multiple size distributions. For example, thermally-insulating particles can have a first average diameter and second average diameter as described herein.

In some variations, the insulator may also have a greater mechanical strength before PPC decomposition. Non-limiting examples of mechanical strength include tensile strength, compressive strength, bend strength, shear strength, and fatigue strength (e.g., vibration resistance). Other types of mechanical strengths are possible.

The catalysts can be above a specific ratio with the substrate. In some variations, the catalyst:substrate ratio can be less than or equal to 90%. In some variations, the catalyst:substrate ratio can be less than or equal to 75%. In some variations, the catalyst:substrate ratio can be less than or equal to 50%.

The substrate can have a surface area above a particular surface area range. In some variations, the substrate can have a surface area of at least 50 $m^2/g$. In some variations, the substrate can have a surface area of at least 100 $m^2/g$. In further variations, the substrate can have a surface area of at least 150 $m^2/g$. In further variations, the substrate can have a surface area of at least 175 $m^2/g$. In further variations, the substrate can have a surface area of at least 200 $m^2/g$. In further variations, the substrate can have a surface area of at least 250 $m^2/g$. In further variations, the substrate can have a surface area of at least 300 $m^2/g$. In further variations, the substrate can have a surface area of at least 350 $m^2/g$. In further variations, the substrate can have a surface area of at least 375 $m^2/g$.

The disclosure is further directed to acids as described herein adsorbed into a substrate and compounded with PPC. The resulting polymer has similar $T_{dec}$ to PPC formulated with the unsupported acid.

The substrate can be chemically stable to the catalyst. In particular, when acid catalysts are used, the substrate is chemically stable to the acid catalyst. The substrate can have a high surface area material that is stable to the target acid.

The compounds described herein can be used in several different applications. In some variations, the compositions can be used as thermal shutdown insulators as described herein. In some other variations, the compositions can be used as sacrificial binders with a lower $T_{dec}$ than conventional PPC.

The compositions described herein can be made in any way known in the art.

In some variations, the PPC is combined with a catalyst in a solvent. The composition is then dried. In some variations, PPC can be with either 1000 ppm or 3000 ppm catalyst and a solvent (e.g., acetone). The solvent was evaporated over 12 hours, and the mixture was placed under vacuum for an additional 4 hours.

Insulators

In some variations, the compositions can be used as insulators. The insulator can be a shutdown insulator before removal of PPC. The insulator can be an insulator to fit a particular shape or form after the removal of PPC. Shutdown insulators become insulating when the insulator reaches a temperature or range of temperatures. Alternatively, after removal of PPC, the lower temperature conditions to form an insulator in a confined area.

In some variations, when PPC is disposed on the substrate, the insulator can exhibit enhanced mechanical properties relative to an insulator without the PPC. These enhanced mechanical properties can include, without limitation, enhanced tensile strength, enhanced compressive strength, enhanced bend strength, enhanced shear strength, and enhanced fatigue strength (e.g., vibration resistance).

As described herein, the PPC is combined with a catalyst to decompose at a decomposition temperature. A decomposition temperature is a temperature at which a 1 mm diameter PPC particle decomposes within a ten minute decomposition time. In some alternatives, a decomposition temperature is a temperature at which a 1 mm diameter PPC particle decomposes within a five minute decomposition time. In further alternatives, a decomposition temperature is a temperature at which 1 mm diameter PPC particle decomposes within a one minute decomposition time. After decomposition of the PPC, the substrate can have a low thermal convection and low thermal conductivity.

Figure 3A:
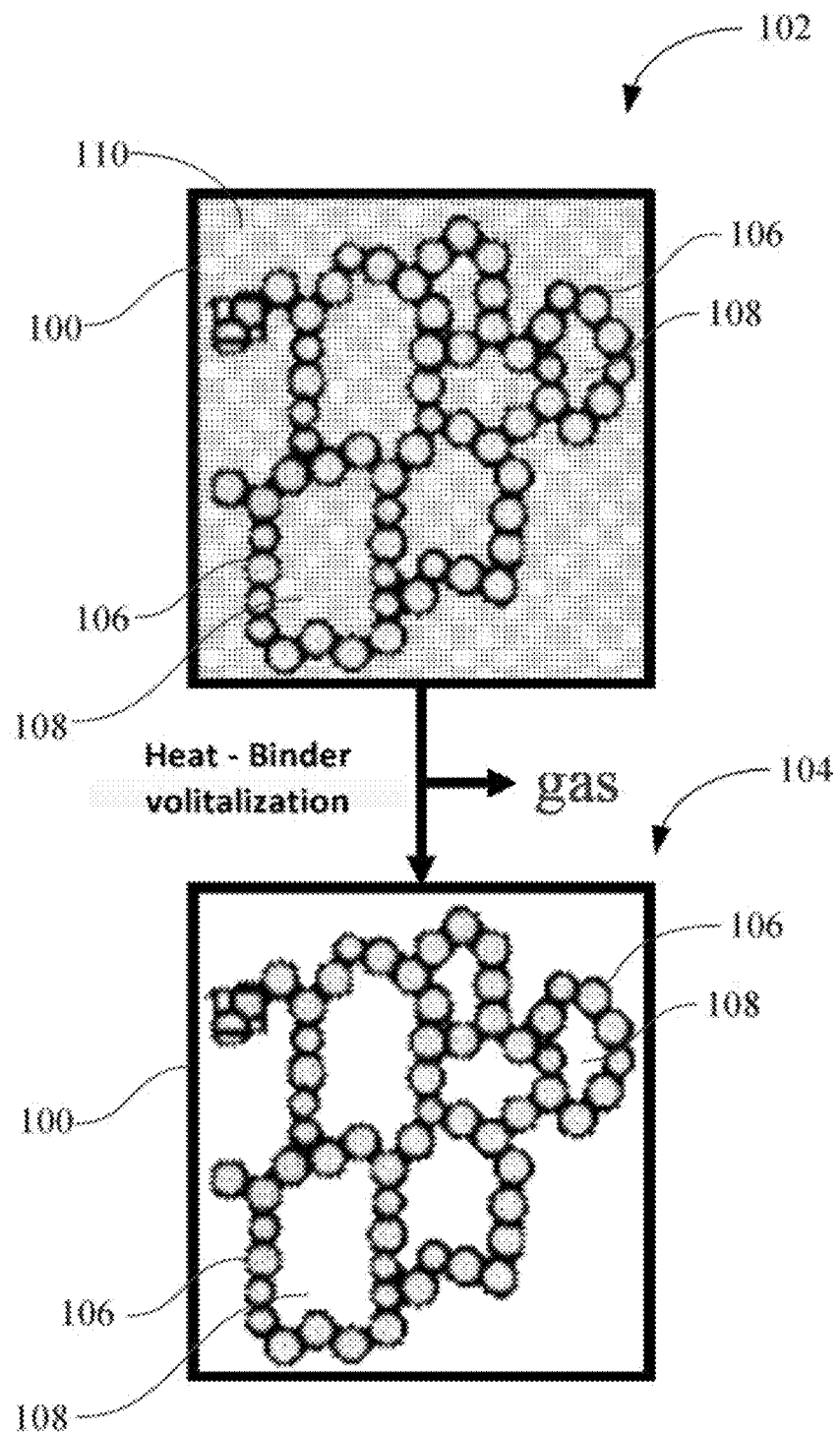
FIG. 3A depicts a schematic diagram depicting a portion of an insulator before and after PPC is removed, according to some illustrative embodiments.

FIG. 3A depicts a schematic diagram of an apparatus as in insulator. Specifically, FIG. 3A depicts a portion of an insulator 100 at time 102 before a thermal event and at time 104 after heating, according to some illustrative embodiments. In some non-limiting variations, the heating can result from an abuse event, such as a thermal (e.g., runaway) event in a battery cell. In the embodiment of FIG. 3A, the insulator 100 includes substrate 106. A composition, catalyst, and/or PPC can be disposed on the substrate, as described herein. Individual substrate particles 106 aggregate to form cells 108, which may be open cells, closed cells, or combinations thereof. These cells 108 define pores and, as a combination, form a porous structure. It will be appreciated that the cells 108 can extended dimensionally to yield solid bodies of virtually any size and shape.

The insulator 100 also includes PPC 110. The PPC 110 may fill substantially all pores in the porous structure, as shown in a PPC-containing insulator 102 of FIG. 3A. The PPC 110 may improve a mechanical strength and a durability of the insulator 100. The PPC 110 may also increase the thermal conductivity of the insulator 100 at lower temperatures before decomposition.

The insulator also includes a PPC decomposition catalyst. In various aspects the catalyst can be disposed on the substrate, as described herein.

At a decomposition temperature, the PPC decomposes, following which the insulator 100 is substantially free of the PPC 110, as shown in non-PPC containing insulator 104 of FIG. 3A. The decomposition temperature can depend on a variety of factors, including the catalyst or combination of catalysts, the amount of each material, the PPC, etc.

In some variations, the insulator has a thermal conductivity at 25° C. of not more than 0.5 W/(m*K) after PPC decomposition. In some variations, the insulator has a thermal conductivity at 25° C. of not more than 0.4 W/(m*K) after PPC decomposition. In some variations, the insulator has a thermal conductivity at 25° C. of not more than 0.35 W/(m*K) after PPC decomposition. In some variations, the insulator has a thermal conductivity at 25° C. of not more than 0.3 W/(m*K) after PPC decomposition. In some variations, the insulator has a thermal conductivity at 25° C. of not more than 0.2 W/(m*K) after PPC decomposition. In some variations, the insulator has a thermal conductivity at 25° C. of not more than 0.1 W/(m*K) after PPC decomposition. In some variations, the insulator has a thermal conductivity at 25° C. of not more than 0.05 W/(m*K) after PPC decomposition. In some variations, the insulator has a thermal conductivity at 25° C. of not more than 0.03 W/(m*K) after PPC decomposition. In some variations, the insulator has a thermal conductivity at 25° C. of not more than 0.02 W/(m*K) after PPC decomposition.

In various aspects, the apparatus can include a fibrous material. In various aspects, the fibrous material can include glass fibers, ceramic fibers, silica fibers, silicon carbide fibers, carbon fibers, carbon nanotubes, and other fibrous materials known in the art. The fibrous material can be associated with the substrate. The fibrous material can be associated with the opacifier (as described below) during formulation. Without wishing to be held to a particular mechanism or mode of action, the fibrous material can impart mechanical strength to the substrate. In some embodiments, the apparatus can include a fibrous material. In these embodiments, the fibrous material can reduce radiative heat transfer. The fibrous material may also impart mechanical strength to the apparatus. Non-limiting examples of the fibrous materials include silicon carbide fibers, carbon fibers, and carbon nanotubes. Other fibrous materials are possible.

In various aspects, the opacifier absorbs or scatters electromagnetic radiation at near-infrared to long-wavelength infrared wavelengths (i.e., about 0.7-15 um), allowing the apparatus to impede a propagation of radiative heat. Opacifiers can have a mean extinction coefficient greater than $1 \times 10^4$ $m^{-1}$ at temperatures greater than 250° C.

By way of example, and without limitation, a carbonaceous opacifier can be added to the apparatus. As such, the apparatus may experience a reduction in radiative heat transfer at temperatures greater than about 100° C. The corresponding reduction in thermal conductivity may be greater than 0.01 W/(m·K) at 100° C. In various embodiments, the carbonaceous opacifier is coated with a refractory material to keep oxygen from being in contact with the carbonaceous opacifier, thereby inhibiting oxidation of the carbonaceous material.

In some variations, the opacifier is a carbonaceous material, such as graphite. Carbonaceous materials can have extinction coefficients that are an order of magnitude higher, per unit mass, in the infrared regime than other opacifiers, such as SiC, $TiO_2$, or $Al_2O_3$. Using a carbonaceous material can improve a thermal conductivity of apparatuses. For example, and without limitation, using graphite instead of SiC can reduce the thermal conductivity by 50% at 800° C.

In some variations, the carbonaceous material can include at least 80% carbon. In some variations, the carbonaceous material can include at least 85% carbon. In some variations, the carbonaceous material can include at least 90% carbon. In some variations, the carbonaceous material can include at least 95% carbon.

In additional variations, by way of illustration and not limitation, the carbonaceous material can have average particle size of at least 20 nm in any one dimension. In another variation, the carbonaceous material can have average particle size of at least 50 nm in any one dimension. In another variation, the carbonaceous material can have average particle size of at least 100 nm in any one dimension. In another variation, the carbonaceous material can have average particle size of at least 200 nm in any one dimension. In another variation, the carbonaceous material can have average particle size of at least 500 nm in any one dimension. In another variation, the carbonaceous material can have average particle size of at least 1 micron in any one dimension. In another variation, the carbonaceous material can have average particle size of at least 5 microns in any one dimension. In another variation, the carbonaceous material can have average particle size of at least 10 microns in any one dimension. In another variation, the carbonaceous material can have average particle size of at least 15 microns in any one dimension.

In additional variations, by way of illustration and not limitation, the carbonaceous material can have average particle size of not more than 20 microns in any one dimension. In another variation, the carbonaceous material can have average particle size of not more than 15 microns in any one dimension. In another variation, the carbonaceous material can have average particle size of not more than 10 microns in any one dimension. In another variation, the carbonaceous material can have average particle size of not more than 5 microns in any one dimension. In another variation, the carbonaceous material can have average particle size of not more than 1 microns in any one dimension. In another variation, the carbonaceous material can have average particle size of not more than 500 nm in any one dimension. In another variation, the carbonaceous material can have average particle size of not more than 200 nm in any one dimension. In another variation, the carbonaceous material can have average particle size of not more than 100 nm in any one dimension. In another variation, the carbonaceous material can have average particle size of not more than 50 nm in any one dimension. In another variation, the carbonaceous material can have average particle size of not more than 20 nm in any one dimension.

In some variations, the carbonaceous material can be coated with a refractory material to inhibit oxidation of the carbonaceous material at a carbon oxidation temperature. In the absence of a refractory material, the carbon oxidation temperature may be greater than 400° C. When coated with a refractory material, the carbon oxidation temperature may be greater than 600° C. When coated with a refractory material, the carbon oxidation temperature may be greater than 800° C. When coated with a refractory material, the carbon oxidation temperature may be greater than 1000° C. In some variations, the refractory coated carbon oxidation temperature may be 600-1200° C., or greater. The carbonaceous material may be graphite, carbon black, carbon nanotubes, or graphene.

In some variations, the refractory coating is covalently attached to the carbonaceous material. Without wishing to be limited to a particular mechanism or mode of action, the carbonaceous material can be modified to form functional groups (e.g., oxygen-containing functional groups). The functional groups can be covalently bonded to the refractory material.

In some variations, the apparatus can include equal to or less than 50 wt % of opacifier. In some variations, the apparatus can include equal to or less than 40 wt % of opacifier. In some variations, the apparatus can include equal to or less than 30 wt % of opacifier. In some variations, the apparatus can include equal to or less than 20 wt % of opacifier. In some variations, the apparatus can include equal to or less than 10 wt % of opacifier.

In some instances, the carbonaceous material has a high aspect ratio, which may increase radiation absorption and provide mechanical strength to the apparatus. The aspect ratio may be greater than 5:1 (e.g., a rod-shaped carbon body). Further, in some instances, the aspect ratio is greater than 10:1. In some instances, the aspect ratio is greater than 15:1. In some instances, the aspect ratio is greater than 20:1. In some instances, the aspect ratio is greater than 100:1. In some instances, the aspect ratio is greater than 250:1. In some instances, the aspect ratio is greater than 100:1. In some instances, the aspect ratio is greater than 500:1. In some instances, the aspect ratio is greater than 750:1. In some instances, the aspect ratio is greater than 100:1. In some instances, the aspect ratio is greater than 1000:1. In some instances, the aspect ratio is greater than 2000:1.

In some embodiments, the infrared absorbing materials can include carbon nanotubes with high tensile strength. In these embodiments, a surface of the carbon nanotubes has been oxidized to reduce thermal conductivity. The carbon nanotubes may be selected with a specific chirality, a specific number of walls, or both, to lower thermal conductivity.

In some embodiments, the apparatuses can include infrared absorbing materials (e.g., carbonaceous materials) coated with the substrates (e.g., $SiO_2$, $Al_2O_3$, etc.) in order to mitigate thermal conduction via contact between infrared absorbing particles.

In one example, the $Al_2O_3$-coated carbon opacifier is prepared by atomic layer deposition. Uncoated carbon was dried at 180° C. Six cycles of ALD alumina were coated onto the fluidized carbon at 50° C. The fluidized carbon was then raised to 180° C. again for drying. Sixteen additional cycles of ALD alumina were coated onto the substrate for a total of 22 coating cycles.

In some variations, the opacifier is greater than 0.05 wt % of solid components in the apparatus (i.e. the total of the substrate, fibrous material, opacifier, and any other solid components in the apparatus). In some variations, the opacifier is greater than 0.25 wt % of solid components in the apparatus. In some variations, the opacifier is greater than 0.50 wt % of solid components in the apparatus. In some variations, the opacifier is greater than 0.75 wt % of solid components in the apparatus. In some variations, the opacifier is greater than 1.0 wt % of solid components in the apparatus. In some variations, the opacifier is greater than 2.5 wt % of solid components in the apparatus. In some variations, the opacifier is greater than 3.0 wt % of solid components in the apparatus. In some variations, the opacifier is greater than 3.5 wt % of solid components in the apparatus. In some variations, the opacifier is greater than 4.0 wt % of solid components in the apparatus. In some variations, the opacifier is greater than 4.5 wt % of solid components in the apparatus. In some variations, the opacifier is greater than 5.0 wt % of solid components in the apparatus.

It will be appreciated that, for opacifier functionality, the apparatus can include materials in addition to or in lieu of carbonaceous materials. In some embodiments, the insulator includes iron titanium oxide (e.g., $FeTiO_3$). The iron titanium oxide can function as an infrared absorbing material that creates an opacifier effect in the insulator. Relative to the substrate alone, a presence of iron titanium oxide can reduce a bulk thermal conductivity of the blended material.

In some embodiments, the insulator includes infrared absorbing materials with a high aspect ratio (e.g., rods or plates). In these embodiments, the high aspect ratio enables the insulator to exhibit a higher effective infrared absorption relative to spheroidal particles alone. Non-limiting examples of such materials include metallic materials, silicon carbide materials, and titanium oxide materials. Other materials are possible, including metal oxides, carbides, borides, or refractory metals. These materials may exhibit various morphologies such as fibers, rods, and plates.

In some embodiments, the opacifier materials can include metal flakes. In such embodiments, the metal flakes can be incorporated with a preferential orientation in the insulator. For example, and without limitation, a thin dimension of the metal flakes could be perpendicular to a plane of the insulator (e.g., in sheet form), thereby providing a low through-plane conductivity and high in-plane conductivity.

In one aspect, the disclosure is directed to an insulating composition including aerogel particles and a plurality of coated carbon particles. In various aspects, the coated carbon particles are distributed in the aerogel particles.

Each coated carbon particle includes a refractory material disposed on carbonaceous material. The carbon particles act as opacifiers by absorbing infrared radiation. Carbon particles can include any type of carbon particle known in the art, including, but not limited to, graphite, carbon black, carbon nanotubes, graphene, and combinations thereof. The refractory material disposed on the carbon particle can be temperature resistant, and can shield the carbon particle from the surrounding environment. Without wishing to be held to any particular mechanism or mode of action, the refractory material inhibits oxidation of the carbon particle at high temperatures (e.g., 500° C. or greater). As such, the coated carbon particles act as an opacifier at both ambient and high temperatures.

In various aspects, the refractory material can include, but is not limited to, materials such as silica, alumina, titania, nickel, boron nitride, zirconia, and $AlF_3$. In some aspects, the refractory material can include a single material. In other aspects, the coating layer can include multiple materials. Further, it will be recognized that the coated carbon particles can include multiple refractory materials. In some variations, the coated carbon particles can be in the form of a powder.

Coated carbon particles can be made using processes known by those skilled in the art. Non-limiting processes of disposing a coating layer on the surface of carbon particles include atomic layer deposition, chemical vapor deposition, and solution-coating from suspension.

Applications

The apparatuses described herein can be used as insulators after the PPC is removed. The composition, including PPC, can be placed in the location that insulation is desired, such as between components. The PPC is removed such that the remaining components to form an insulator. The placement of such the composition thereby allows for insulation to be placed at a desired location. Further, PPC can be removed while keeping any surrounding non-insulating components at a lower temperature due to the reduced $T_{dec}$ using the catalyst. In such variations, the resulting composition after removal of the PPC can include a substrate, fibrous material, and/or opacifiers and refractory materials.

In various aspects, the apparatus can be used as a "shutdown insulator" that causes PPC decomposition at a particular temperature. The shutdown insulator can be disposed in locations such as between adjacent battery cells in a battery pack to improve insulation among cells. A battery cell experiencing an abuse condition can rise in temperature due to internal self-heating, and release heat and vaporized electrolytes to adjacent areas. This heat can propagate to neighboring battery cells induce thermal events in neighboring battery cells. It would improve battery run time if higher energy such as those containing $Li(Ni,Co,Al)O_2$, $LiCoO_2$, or nickel-rich $Li(Ni,Co,Mn)O_2$ cathode materials could be packaged with aspects of the apparatuses described herein to form battery packs of higher energy density.

The apparatuses described herein can be used as shutdown insulators. When disposed between battery cells and heated, PPC degrades to produce an insulating degradation product. The thermally insulated product can reduce a rate of heat transfer to neighboring cells during a thermal event.

Figure 3B:
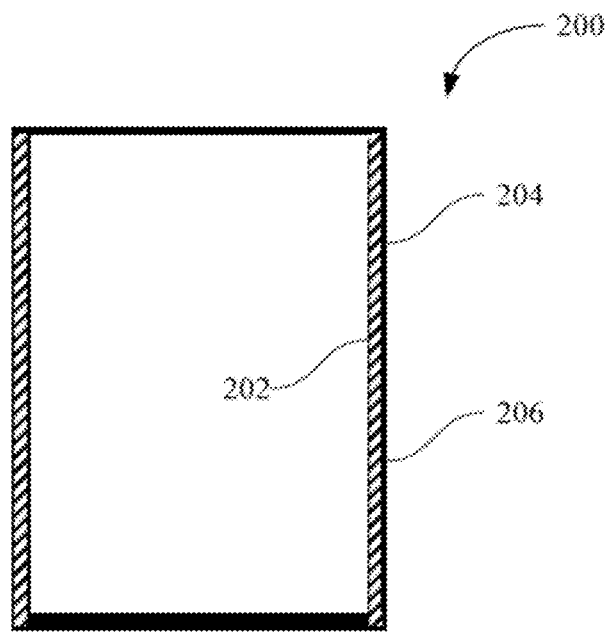
FIG. 3B depicts a cross-sectional view depicting an insulated housing for a battery cell, according to some illustrative embodiments.
Figure 3C:
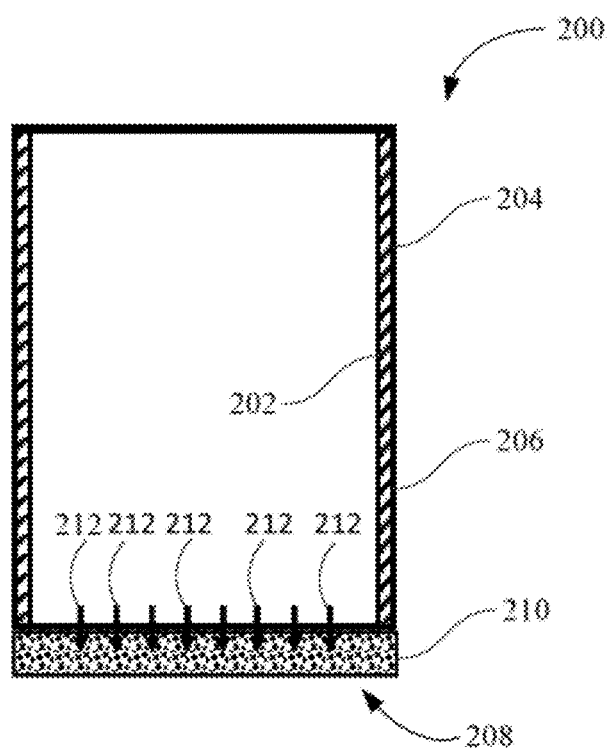
FIG. 3C depicts a cross-sectional view depicting an insulated housing for a battery cell including an insulator and a thermally-conductive layer on a bottom portion, according to some illustrative embodiments.

FIGS. 3B and 3C represent a cross-sectional view of an insulated housing 200 for a battery cell, according to some illustrative embodiments. The insulated housing 200 includes an inner metallic layer 202, a shutdown insulator material 204, and an outer metallic layer 206. The inner metallic layer 202 and the outer metallic layer 206 may be formed of an aluminum material or a stainless steel material. The shutdown insulator material 204 can be selected from any PPC-catalyst composition described herein. In some variations, the shutdown insulator material includes a substrate.

When the shutdown insulator material reaches the $T_{dec}$ of the PPC-catalyst composition, the PPC decomposes to polypropylene carbonate, carbon dioxide, and water. The outer metallic layer 206 can serve as the thermal conductor for the insulated housing 200, conducting heat from the insulator out of the housing. The shutdown insulator material 204 may be disposed within all walls of the housing 200 and a lid thereof, such as shown in FIG. 3B.

The shutdown insulator material 204 may be only in some walls, with non-insulated walls allowing heat to conduct into or out of the battery cell. In some embodiments, such as that shown in FIG. 1B, the shutdown insulator material 204 lacks a bottom portion 208 of the housing 200. The bottom portion 210 includes a thermally-conductive layer (e.g., a metal layer or plate) that allows heat to exit the battery cell. A direction of such heat flow is shown by arrows 212 in FIG. 1B.

Figure 3D:
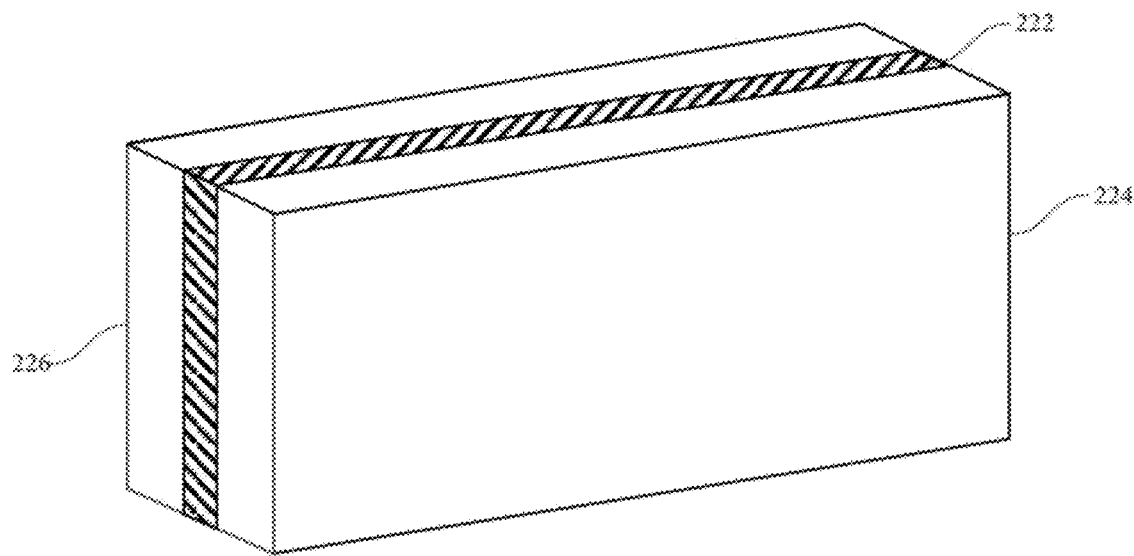
FIG. 3D depicts a perspective view depicting a battery pack having an insulator disposed between a first battery cell and a second battery cell, according to some illustrative embodiments.

FIG. 3D represents a perspective view of a shutdown insulator 222 disposed between a first battery cell 224 and a second battery cell 226, according to some illustrative embodiments. Although FIG. 3D depicts the battery pack 220 as having two battery cells 224, 226, this variation is not intended as limiting. More than two battery cells can be arranged having a shutdown insulator disposed between each. A shutdown insulator 222 may be disposed in any configuration between such battery cells.

Figure 3E:
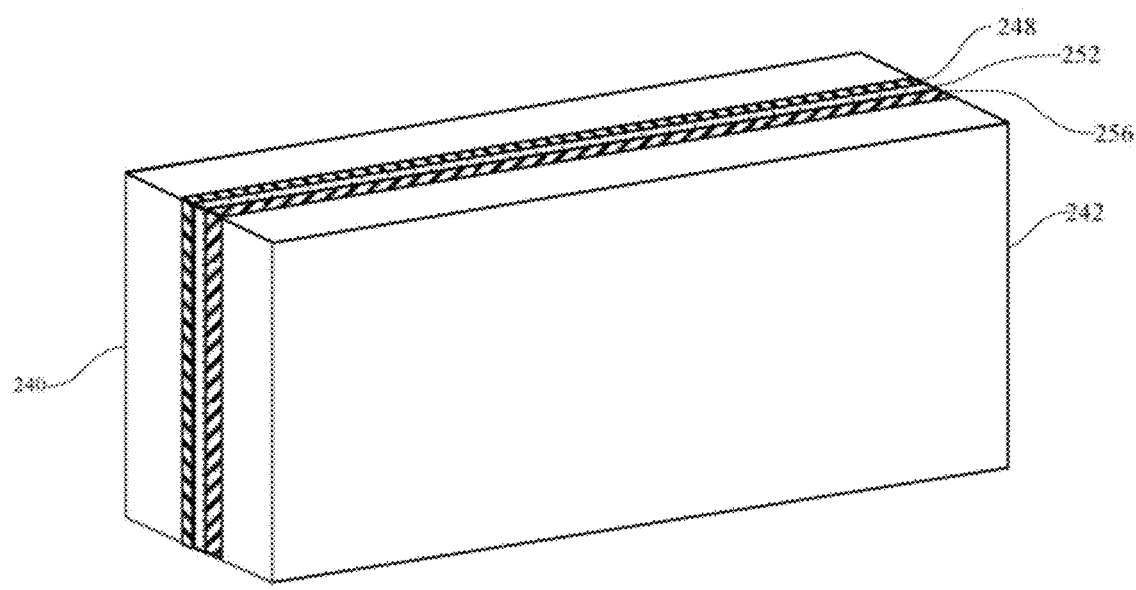
FIG. 3E is a cross-sectional view depicting layers of insulated housing, according to some illustrative embodiments.

FIG. 3E represents a perspective view of two battery cells 240 and 242 separated by shutdown insulators 248 and 256 and metal layer 252, according to some illustrative embodiments. In the embodiment of FIG. 1D, each of battery cells 240 and 242 is in thermal contact with shutdown insulators 248 or 256, respectively. Metal layer 252 separates shutdown insulators 248 and 256. Shutdown insulator 248 is in thermal contact with battery cell 240. Metal layer 252 is in thermal contact with shutdown insulator 248 opposite battery cell 240. Metal layer 252 is in thermal contact with shutdown insulator 256 opposite shutdown insulator 248. Shutdown insulator 256 is in thermal contact with metal layer 252 opposite shutdown insulator 248. Shutdown insulator 256 also is in thermal contact with battery cell 242 opposite metal layer 252. The components in thermal contact with each other can be adhered one to the other via an adhesive, or the like.

Metal layer 252 can be any metal, including but not limited to an aluminum alloy or stainless steel. In various aspects, metal layer 252 can serve as a thermal conductor to conduct heat away from the battery.

It will be recognized that the thicknesses of the shutdown insulators and metal layers are not necessarily to scale. Although FIG. 3E depicts the battery pack 220 as having two battery cells 224, 226, this variation is not intended as limiting. The battery pack 220 may have more than two battery cells.

The shutdown insulator, metal layers, or other components may be disposed in any configuration between such battery cells in any order or arrangement. It will further be recognized that the shutdown insulator depicted in FIG. 3D or 3E can be any shutdown described herein or known in the art.

Figure 6A:
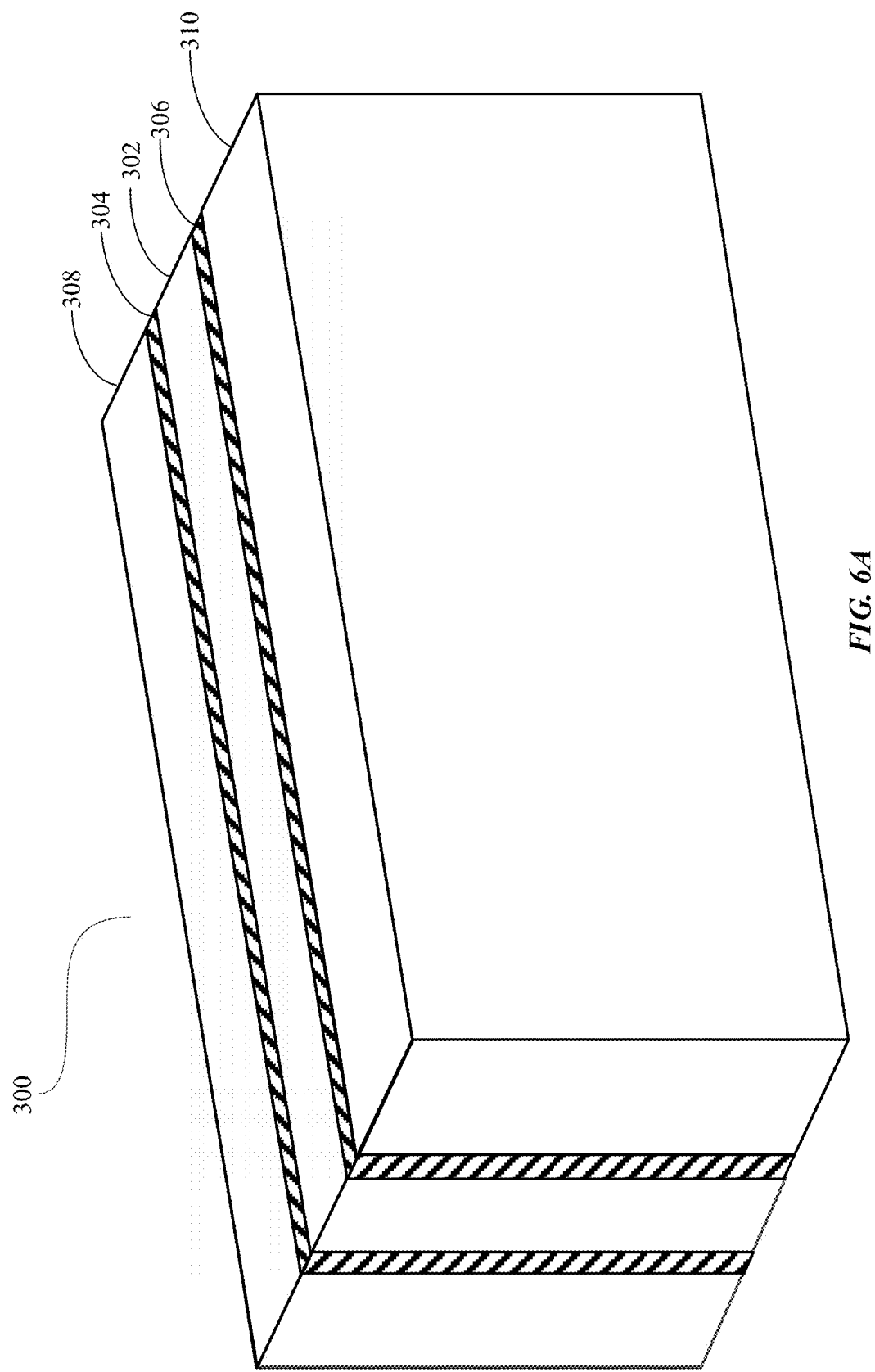
FIG. 6A depicts a perspective view of an apparatus including a battery cell, insulators, and heat sinks, according to some illustrative embodiments.

FIG. 6A depicts a perspective view of an apparatus 300. The apparatus 300 comprises insulators 304 and 306 disposed on either side of a battery cell 302. The apparatus further comprises heat sinks 308 and 310. Heat sink 308 is positioned on the opposite side of battery cell 302 from insulator 304, and heat sink 310 is positioned on the opposite side of battery cell 302 from insulator 306. The positions of heat sinks 308 and 310 are analogous to the positions of battery cells lying adjacent to battery cell 302 in a battery pack.

Figure 6B:
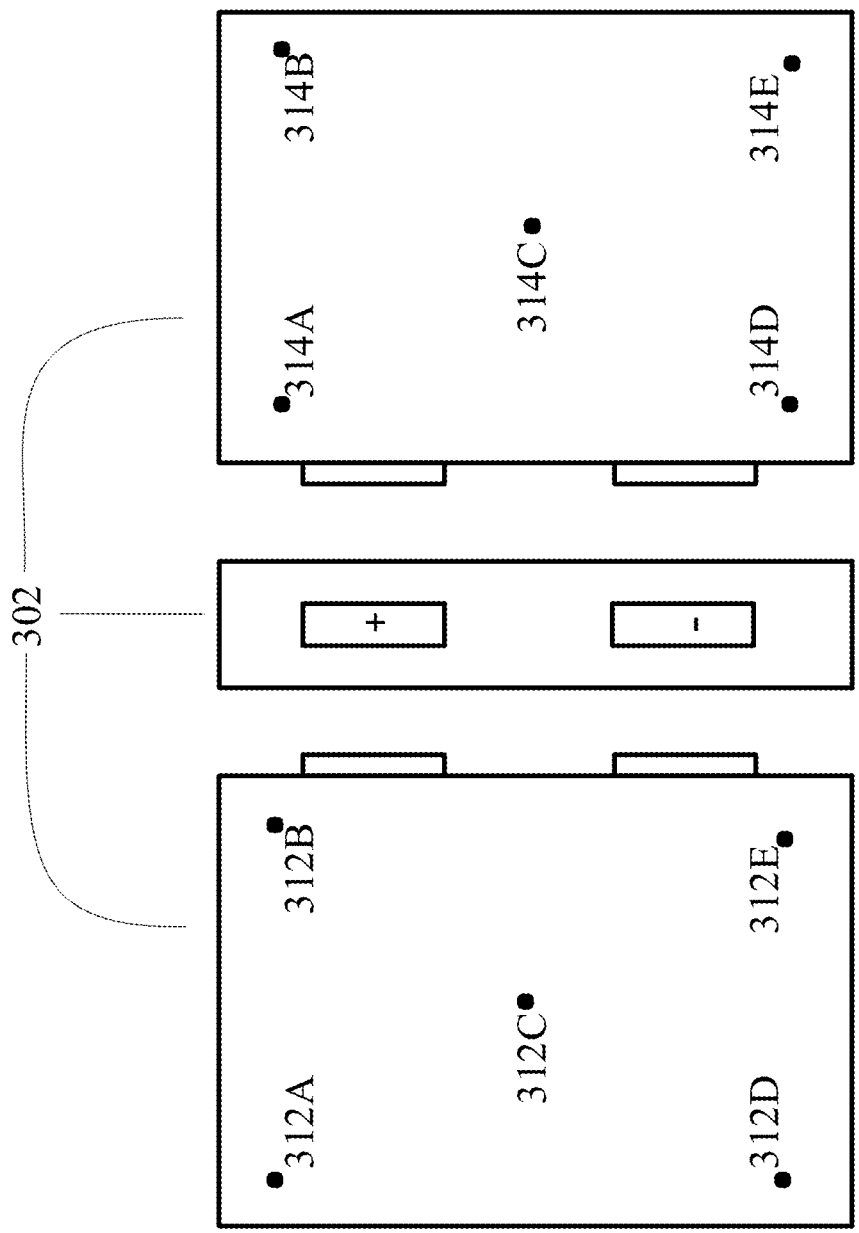
FIG. 6B depicts thermocouples positioned on a battery cell of the apparatus of FIG. 6A, according to some illustrative embodiments.

FIG. 6B depicts the position of thermocouples on each side of the battery cell 302 of apparatus 300. Thermocouples 312A, 312B, 312C, 312D, and 312E are positioned on a first side of battery 302. Similarly, thermocouples 314A, 314B, 314C, 314D, and 314E are positioned on a second side of battery cell 302. With reference to FIG. 6A, thermocouples 312A, 312B, 312C, 312D, and 312E are positioned between battery cell 302 and insulator 304, and thermocouples 314A, 314B, 314C, 314D, and 314E are positioned between battery cell 302 and insulator 306.

Figure 6C:
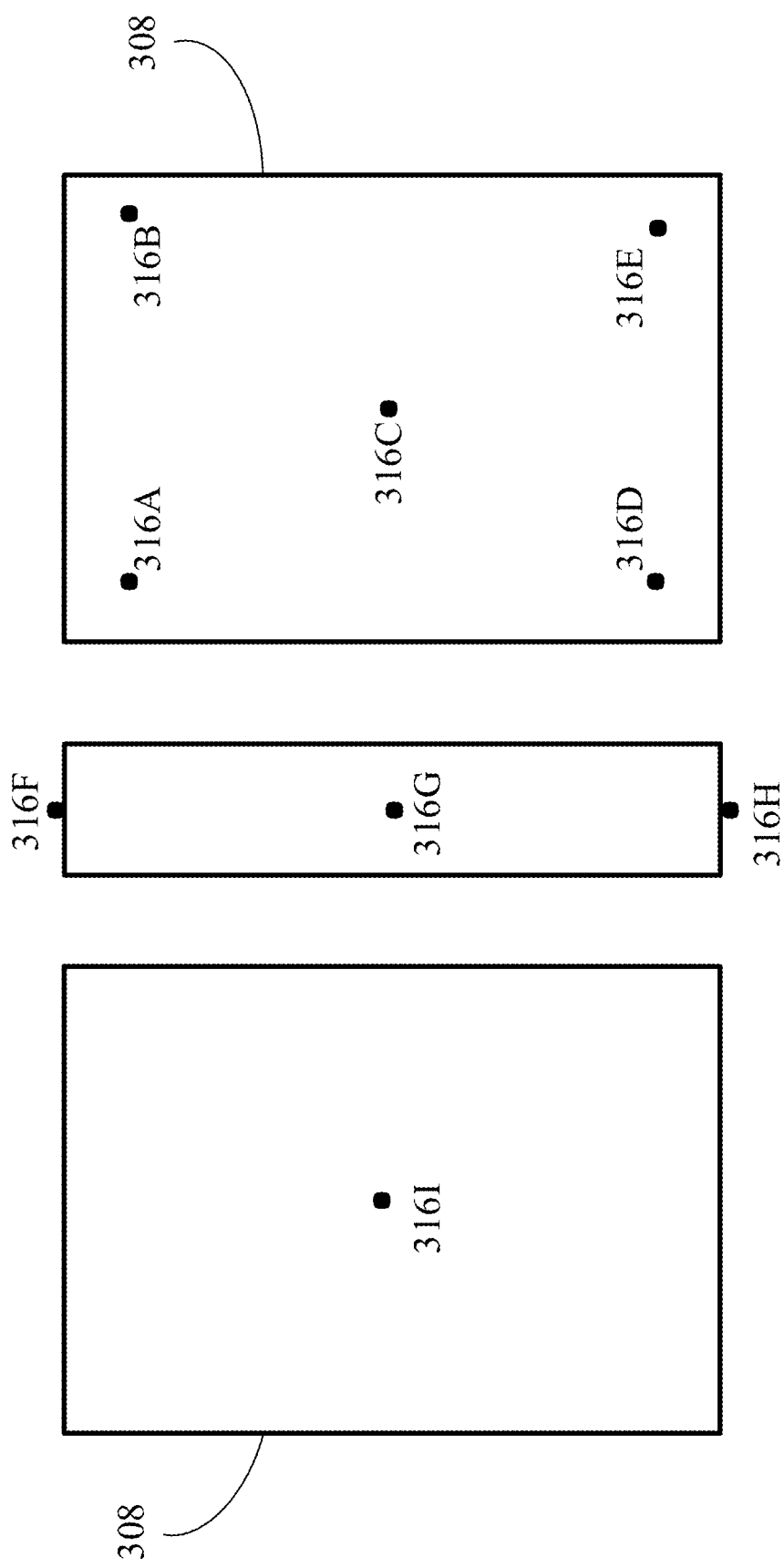
FIG. 6C depicts thermocouples positioned on a heat sink of the apparatus of FIG. 6A, according to some illustrative embodiments.

FIG. 6C depicts a bottom, side and top view of heat sink 308. Thermocouples 316A-316I are positioned on heat sink 308. Specifically, thermocouples 316A, 316B, 316C, 316D, and 316E are positioned on a top side of heat sink 308. Thermocouples 316F, 316G, and 316H are positioned along a side of heat sink 308. Thermocouple 316I is positioned on a bottom side of heat sink 308. With reference to FIG. 6A, thermocouples 316A, 316B, 316C, 316D, and 316E are positioned between the insulator 304 and heat sink 308.

During operation, apparatus 300 was punctured. The temperature at each of thermocouples 312A-E, 314A-E, and 316A-I was measured as a function of time to test different insulator materials at insulators 304 and 306. Table 1 depicts the percent compositions of different materials used as insulators 304 and 306. Trifluoromethanesulfonic acid and tetrabutylammonium acetate act as PPC decomposition catalysts. Titanium dioxide acted as an opacifier. Glass fibers provided rigidity after the PPC decomposes.

TABLE 1

|  | Weight Percent Composition | | |
| --- | --- | --- | --- |
|  | Insulator 1 | Insulator 2 | Insulator 3 |
| Trifluoromethanesulfonic acid | 11.8 | 5.8 | 0 |
| Titanium Dioxide | 8.42 | 7.48 | 6.73 |
| PPC | 71 | 71 | 71 |
| Glass Fibers | 2.03 | 2.03 | 2.03 |
| Tetrabutylammonium acetate | 0.95 | 1.89 | 2.84 |
| Fumed Silica | 5.8 | 11.8 | 17.4 |

Figure 7A:
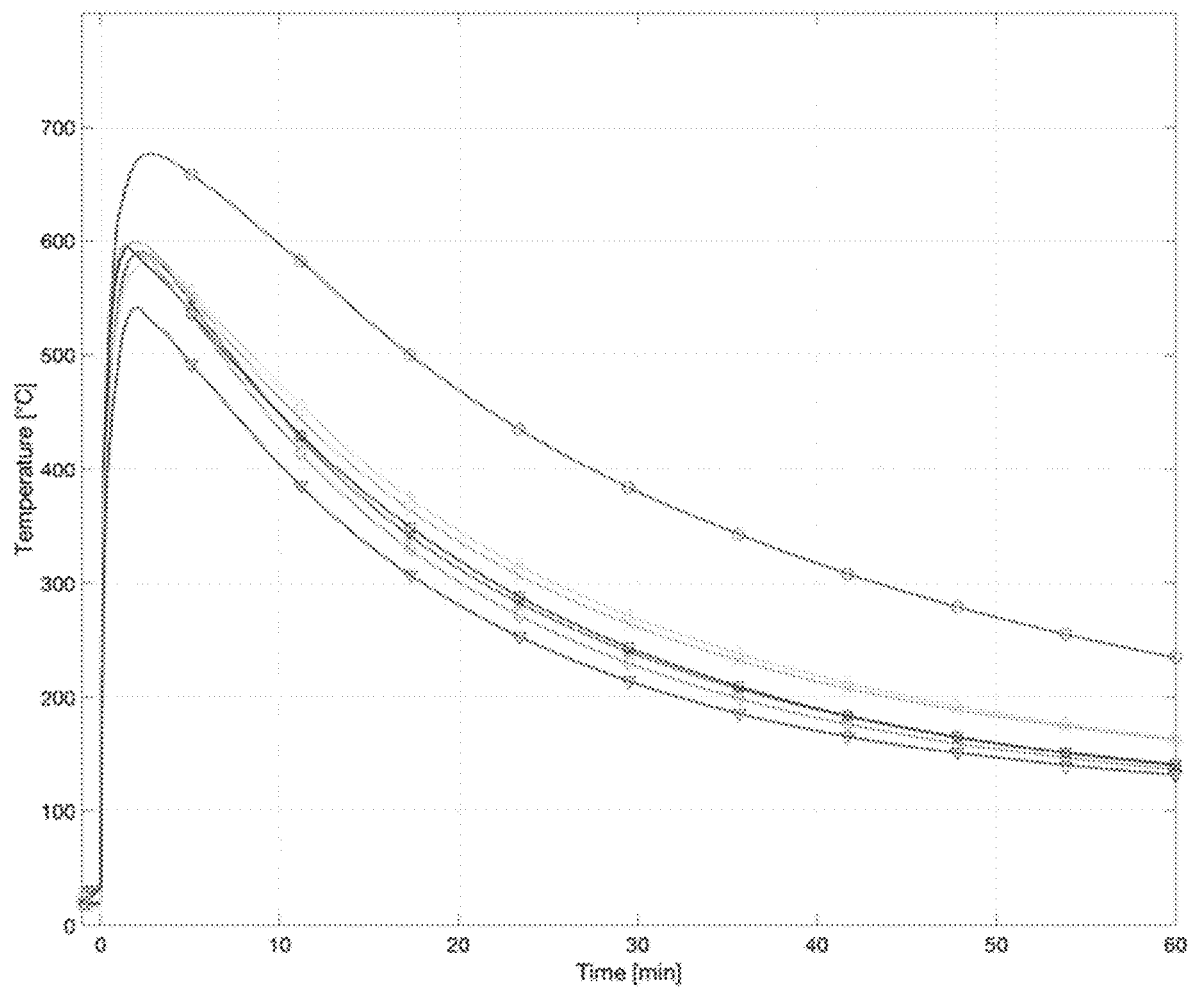
FIG. 7A compares the average temperature as a function of time at various positions on a battery cell of the apparatus of FIGS. 6A-C for different insulator compositions, according to some illustrative embodiments.

FIG. 7A depicts the average temperature as a function of time between battery cell 302 and insulators 304 and 306, respectively. The temperatures at thermocouples 312A-312E and 314A-314E were measured, averaged, and plotted as a function of time for different insulator materials after battery cell puncture. Fumed silica insulator without PPC or catalyst was tested alone as a control. Two trials each of Insulators 1, 2, and 3 were conducted.

The control insulator having fumed silica alone had a higher temperature for the entire measured period. However, when the PPC and catalyst composition was disposed in the fumed silica in Insulators 1-3, the temperature for the entire measured time course was substantially reduced. The reduced temperature was due to decomposition of PPC in an endothermic reaction within insulators 304 and 306.

Figure 7B:
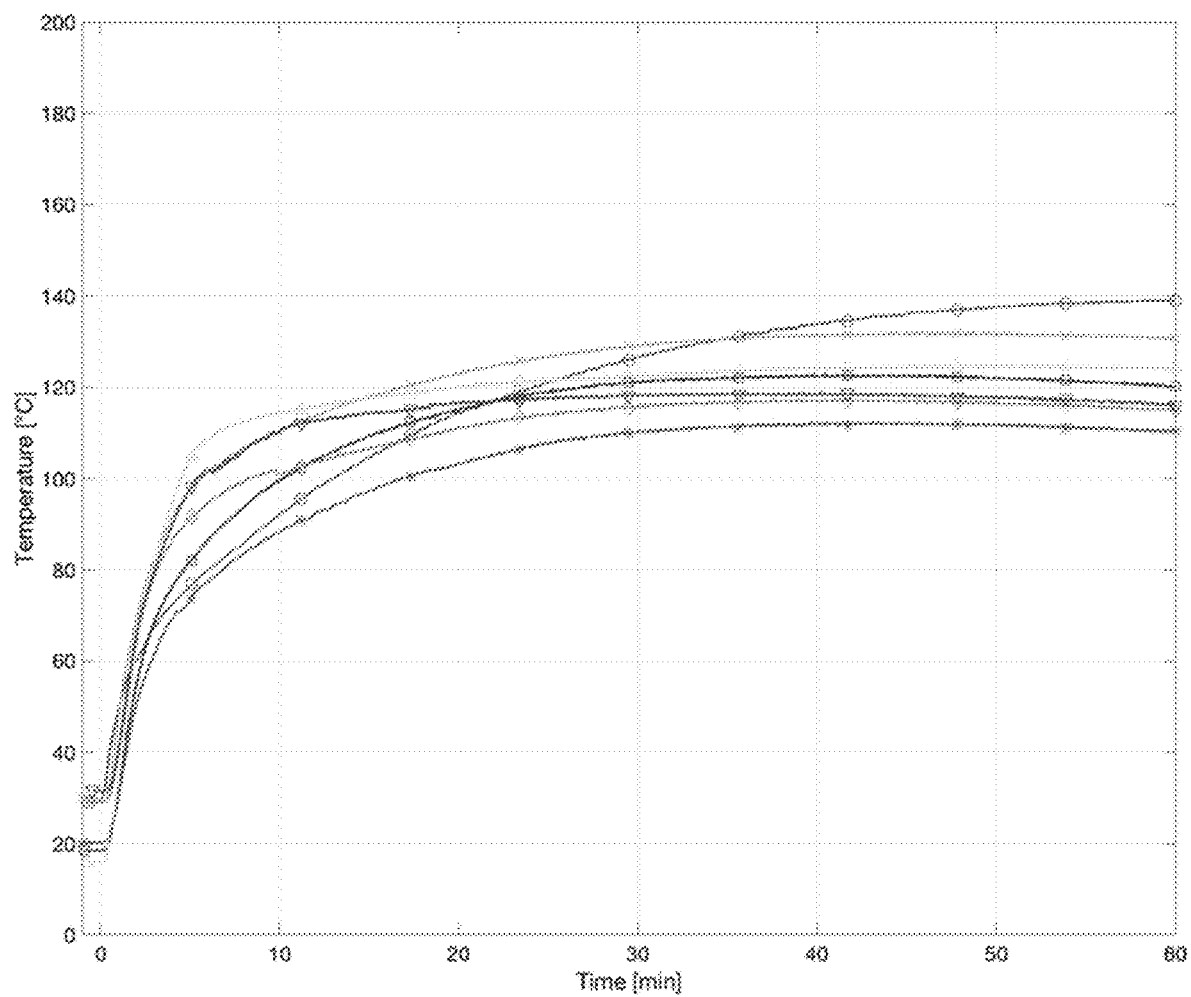
FIG. 7B depicts the average temperature on a heat sink for the apparatus of FIGS. 6A-C for different insulator materials, according to some illustrative embodiments.

FIG. 7B depicts the average temperature of heat sinks of apparatus 300 for different materials. Returning to FIG. 6C, the temperature at each of thermocouples 316A-316I was measured, averaged, and plotted as a function of time for different insulator materials. Fumed silica insulator without PPC or catalyst was tested alone as a control. Two trials each of Insulators 1, 2, and 3 were conducted.

When the PPC was present in the insulator, PPC decomposition resulted in a steeper initial measured temperature than fumed silica alone. This was because the endothermic PPC decomposition reaction in Insulators 1-3 resulted in the initial transfer of heat to thermocouples 316A-316I on the opposite side of the insulator from battery cell 302. After the PPC decomposed, the heat sinks were at a lower measured temperature than when insulators lacked PPC because of heat absorbed during PPC decomposition.

Insulators 1-3, which contained PPC and one or more catalysts, each performed more effectively than in the absence of PPC and catalyst. Insulator 3, which contained tetrabutylammonium acetate, no trifluoromethanesulfonic acid, and a larger amount of fumed silica, had a lower final temperature than both Insulators 1 and 2. Insulator 1, which included the highest percentage of trifluoromethanesulfonic acid and lowest percentage of both tetrabutylammonium acetate and fumed silica, had a higher final temperature than both Insulators 2 and 3.

Figure 8:
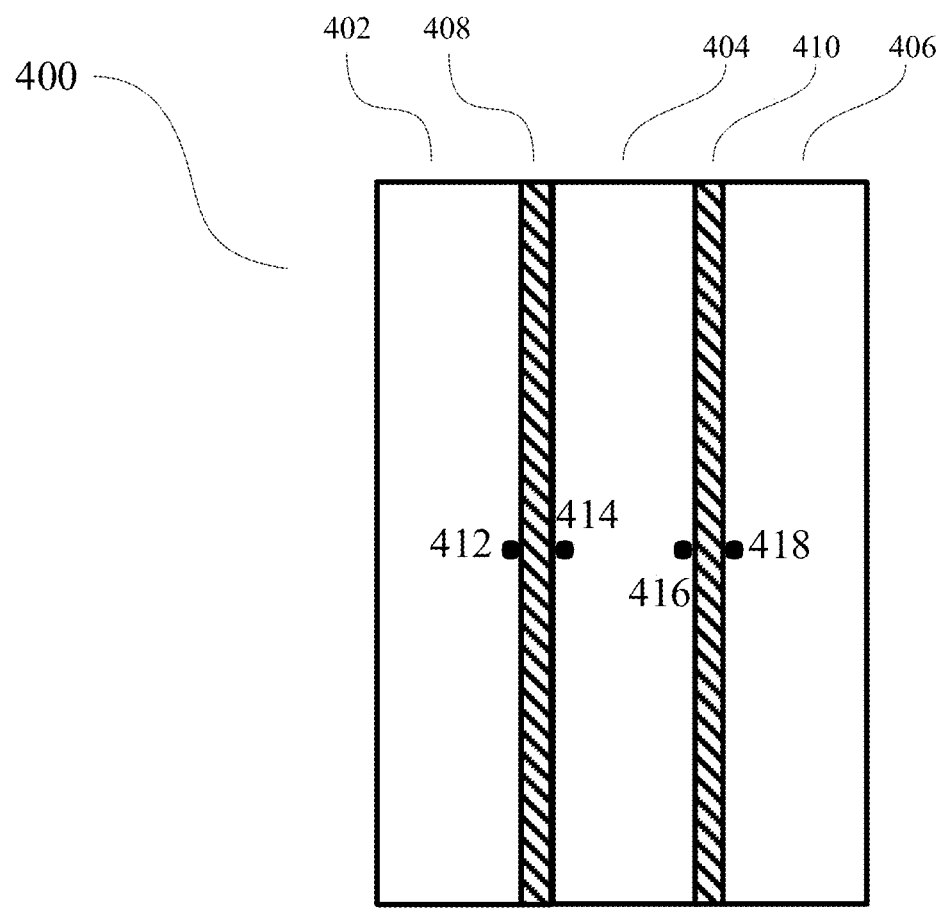
FIG. 8 depicts a side view of an apparatus including three battery cells separated by insulators, according to some illustrative embodiments.

FIG. 8 depicts a side view of apparatus 400. Apparatus 400 comprises three battery cells 402, 404, and 406. Battery cells 402 and 404 are separated by insulator 408, and battery cells 404 and 406 are separated by insulator 410.

The temperature on either side of the insulators 408 and 410 were measured at positions 412, 414, 416, and 418. Positions 414 and 416 lay between battery cell 404 and insulators 408 and 410, respectively. Positions 412 and 418 lay on the opposite side of insulators 408 and 410 from battery cell 404.

Figure 9A:
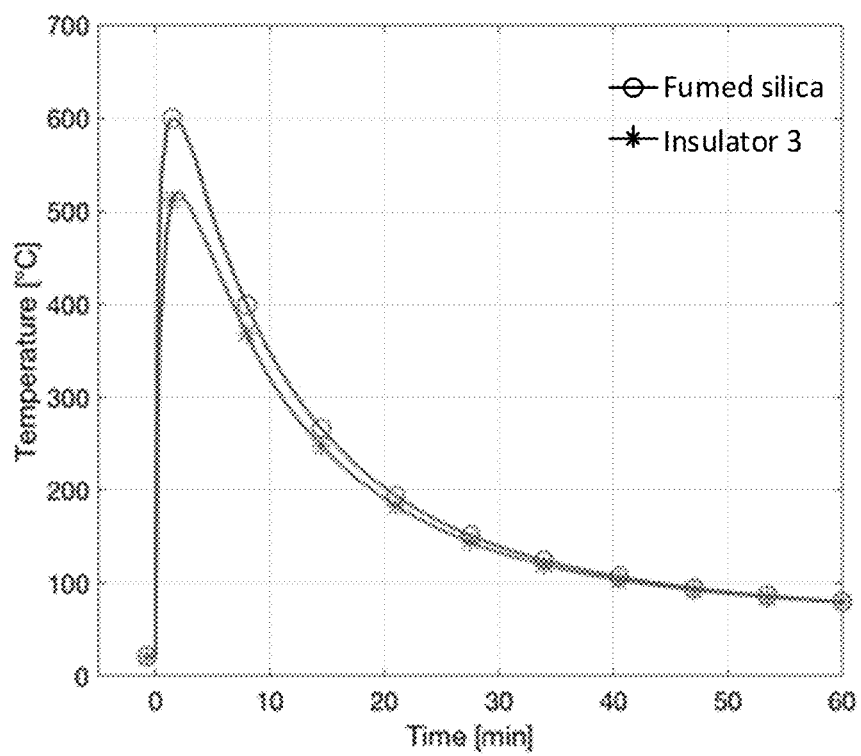
FIGS. 9A-D depict the temperature as a function of time at different positions of the apparatus of FIG. 8, according to some illustrative embodiments.
Figure 9B:
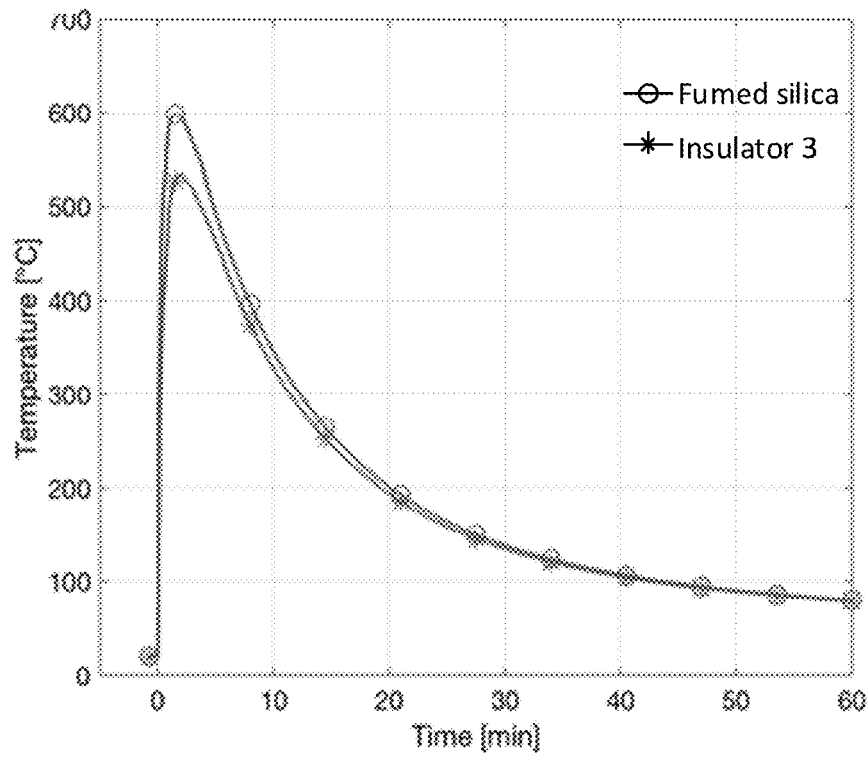

FIGS. 9A-D depict the temperature as a function of time at different positions for two insulator materials. FIGS. 9A and 9B depict the temperature as a function of time at positions 414 and 416 between battery cell 404 and insulators 408 and 410, respectively. Insulators 408 and 410 containing fumed silicate alone and Insulator 3 were tested. The temperature for fumed silicate alone was higher than Insulator 3 because the PPC-containing Insulator 3 undergoes an endothermic PPC decomposition reaction. As a result, the peak temperature is higher in the absence of PPC and catalyst.

Figure 9C:
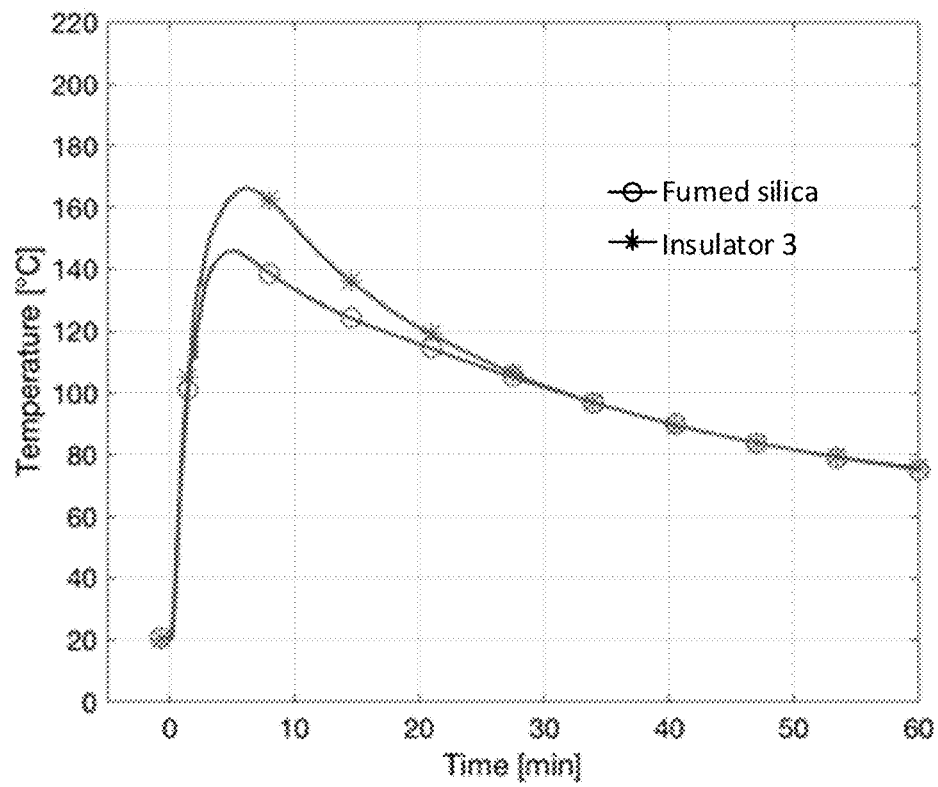
Figure 9D:
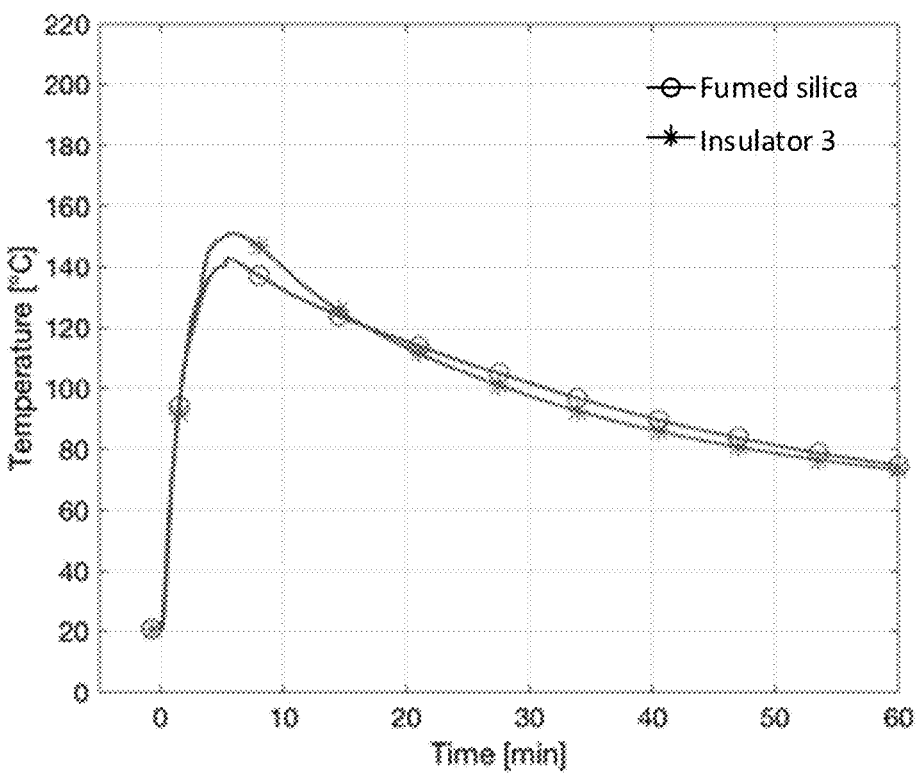

FIGS. 9C and 9D depict the temperature as a function of time at positions 412 and 418, on the opposite side of insulators 408 and 410 from battery cell 404. Fumed silicate alone and Insulator 3 were again tested. The initial heat when Insulator 3 was present was higher because the insulator transferred heat energy from the insulator to positions 412 and 418 during the endothermic PPC decomposition reaction. After the PPC decomposed, insulators 408 and 410 behaved as microporous insulation, and the temperature dropped slightly below the temperature in the absence of PPC and catalyst.

Sacrificial Binders

In various aspects, the PPC-catalyst compositions can be used as sacrificial binders. Sacrificial binders function by subjecting one or more substrate and a binder to thermal conditions that can decompose the PPC, leaving the substrates bound together. The PPC-catalyst compositions used herein can be used as sacrificial binders at lower temperatures than PPC alone, resulting the very little decomposition product in the bound substrates. The substrates can be bound at a lower decomposition temperature with less than 10 ppm residue from PPC.

In various aspects, the PPC-catalyst compositions used herein can be used as sacrificial binders in an ambient atmosphere, or under nitrogen, hydrogen, or argon.

The sacrificial binder can be used in electronic passive components, metal brazing, abrasive tools, glass paste and preforms, sealing glass binders, thick film pastes, technical ceramic parts, 3E Printing, energy storage/batteries, decomposable channel former, pore formers, medical implants, and lost foam casting.

In some variations, the compositions described herein can be used on electronic chips. In instances where electronic components are printed on plastics, components can be bound by heating to the lower $T_{dec}$ of the PPC-catalyst composition. Unlike other compositions having a higher $T_{dec}$, the disclosed compositions can be used to bond substrates at a lower heating point.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

The invention claimed is:

1. An apparatus comprising:
   a substrate; and
   a composition disposed on the substrate, the composition comprising:
      a polypropylene carbonate (PPC), and
      a catalyst selected from the group consisting of 1-butyl-1-methylpyrrolidine, $NBu_4$-acetate, $NBu_4$-$BBu_4$, $NEt_4$-acetate, $NEt_4$-F, $NEt_4$-$HCO_3$, $NEt_4$-$NO_3$, $NMe_4$-acetate, $NEt_4$-Cl, $NBu_4$-$BPh_4$, and $NEt_4$-$CF_3SO_3$.

2. The apparatus of claim 1, wherein the PPC has an average molecular weight of at least 100 kDa and less than or equal to 400 kDa.

3. The apparatus of any claim 1, wherein the catalyst is in an amount from 500-50000 ppm relative to the PPC.

4. The apparatus of claim 1, wherein the substrate is selected from the group consisting of silica, $Al_2O_3$, $ZrO_2$, and MgO.

5. The apparatus of claim 4, wherein the substrate is silica.

6. The apparatus according to claim 1, further comprising a fibrous material.

7. The apparatus of claim 6, wherein the fibrous material is selected from the group consisting of glass fibers, ceramic fibers, and silica fibers.

8. The apparatus of claim 7, wherein the fibrous material comprises glass fibers.

9. The apparatus of claim 1, further comprising an opacifier comprising a material selected from the group consisting of silicon carbide, titania, and a carbonaceous material.

10. The apparatus of claim 1, further comprising an opacifier comprising a carbonaceous material, wherein the carbonaceous material is coated with a refractory material that inhibits oxidation at a carbon oxidation temperature.

11. The apparatus of claim 10, wherein the refractory material is selected from the group consisting of silica, alumina, titania, nickel, boron nitride, zirconia, and $AlF_3$.

12. The apparatus of claim 10, wherein the carbon oxidation temperature of the opacifier coated with the refractory material is greater than 800° C.

13. The apparatus of claim 10, wherein the carbonaceous material has an aspect ratio greater than 5:1.

14. An apparatus comprising:
a first component and a second component; and
the apparatus according to claim 1 disposed between the first component and second component.

15. A battery pack comprising:
a first battery cell and a second battery cell; and
the apparatus according to claim 1 disposed between the first battery cell and the second battery cell.

\* \* \* \* \*